US008316001B1

(12) United States Patent
Albrecht et al.

(10) Patent No.: US 8,316,001 B1
(45) Date of Patent: Nov. 20, 2012

(54) APPARATUS AND METHOD FOR PERFORMING ANALYSES ON DATA DERIVED FROM A WEB-BASED SEARCH ENGINE

(75) Inventors: Paul Albrecht, Bedford, MA (US); Joseph G. Hadzima, Jr., Wellesley, MA (US); Hoo-Min D. Toong, Cambridge, MA (US)

(73) Assignee: IPVision, Inc., Cambridge, MA (US)

( * ) Notice: Subject to any disclaimer, the term of this patent is extended or adjusted under 35 U.S.C. 154(b) by 507 days.

(21) Appl. No.: 11/779,724

(22) Filed: Jul. 18, 2007

Related U.S. Application Data

(63) Continuation-in-part of application No. 11/096,562, filed on Apr. 1, 2005, now abandoned, and a continuation-in-part of application No. 11/096,563, filed on Apr. 1, 2005, now abandoned, and a continuation-in-part of application No. 11/097,432, filed on Apr. 1, 2005, and a continuation-in-part of application No. 11/096,931, filed on Apr. 1, 2005, now abandoned, and a continuation-in-part of application No. 11/096,905, filed on Apr. 1, 2005, and a continuation-in-part of application No. 11/096,914, filed on Apr. 1, 2005, now abandoned, and a continuation-in-part of application No. 11/096,902, filed on Apr. 1, 2005, now abandoned, and a continuation-in-part of application No. 11/096,371, filed on Apr. 1, 2005, now abandoned, and a continuation-in-part of application No. 11/097,569, filed on Apr. 1, 2005, now abandoned, and a continuation-in-part of application No. 11/096,564, filed on Apr. 1, 2005, and a continuation-in-part of application No. 11/097,431, filed on Apr. 1, 2005, now abandoned, and a continuation-in-part of application No. 11/097,571, filed on Apr. 1, 2005, now abandoned, and a continuation-in-part of application No. 11/097,570, filed on Apr. 1, 2005, now abandoned, and a continuation-in-part of application No. 11/096,386, filed on Apr. 1, 2005, now abandoned, and a continuation-in-part of application No. 11/096,561, filed on Apr. 1, 2005, now abandoned, and a continuation-in-part of application No. 10/624,918, filed on Jul. 22, 2003, application No. 11/779,724, which is a continuation-in-part of application No. 11/532,092, filed on Sep. 14, 2006.

(60) Provisional application No. 60/397,542, filed on Jul. 22, 2002.

(51) Int. Cl.
G06F 17/30 (2006.01)
(52) U.S. Cl. ...................................... 707/706
(58) Field of Classification Search .................. 707/3–6, 707/10, 102, 104.1, 706
See application file for complete search history.

(56) References Cited

U.S. PATENT DOCUMENTS 3,916,387 A 10/1975 Woodrum .......................... 17/30
(Continued)

FOREIGN PATENT DOCUMENTS
WO 02/091155 11/2002

OTHER PUBLICATIONS

Google Patent search engine and Advanced Search in Google Patent search engine web site.*

(Continued)

Primary Examiner — Debbie Le
(74) Attorney, Agent, or Firm — Sunstein Kann Murphy & Timbers, LLP

(57) ABSTRACT

A computer-implemented method of performing analysis (such as patent analysis) on data derived from a web-based search engine pursuant to a search query includes in one embodiment causing display, in a first element of a patent analytics web page, in a digital computing device, of search results content served by the search engine. The embodiment further includes, in a first computer process, analyzing data associated with the search results content according to criteria (which optionally may be specified by a user when specifying the search query) to produce analysis results and in a second computer process, causing display of the analysis results. A related apparatus is also provided.

47 Claims, 30 Drawing Sheets

U.S. PATENT DOCUMENTS

| | | | | |
|---|---|---|---|---|
| 5,790,853 | A | 8/1998 | Nomura et al. | 395/674 |
| 5,802,256 | A | 9/1998 | Heckerman et al. | 395/75 |
| 5,808,615 | A | 9/1998 | Hill et al. | 345/356 |
| 5,870,770 | A | 2/1999 | Wolfe | 707/501 |
| 5,918,232 | A | 6/1999 | Pouschine et al. | 707/103 |
| 5,960,399 | A | 9/1999 | Barclay et al. | 704/270 |
| 5,991,751 | A | 11/1999 | Rivette et al. | 707/1 |
| 5,991,780 | A | 11/1999 | Rivette et al. | 707/512 |
| 5,991,782 | A | 11/1999 | Miyagawa et al. | 707/513 |
| 6,038,574 | A | 3/2000 | Pitkow et al. | 707/513 |
| 6,144,962 | A | 11/2000 | Weinberg et al. | 707/10 |
| 6,175,824 | B1 | 1/2001 | Breitzman et al. | 705/36 |
| 6,182,091 | B1 | 1/2001 | Pitkow et al. | 707/501 |
| 6,256,648 | B1 | 7/2001 | Hill et al. | 707/501 |
| 6,263,351 | B1 | 7/2001 | Wolfe | 707/501 |
| 6,272,493 | B1 | 8/2001 | Pasquali | 707/10 |
| 6,285,999 | B1 | 9/2001 | Page | 707/5 |
| 6,286,018 | B1 | 9/2001 | Pitkow et al. | 707/513 |
| 6,289,342 | B1 | 9/2001 | Lawrence et al. | 707/7 |
| 6,339,767 | B1 | 1/2002 | Rivette et al. | 707/2 |
| 6,351,746 | B1 | 2/2002 | Gebauer | 707/10 |
| 6,356,283 | B1 | 3/2002 | Guedalia | 345/760 |
| 6,457,002 | B1 | 9/2002 | Beattie et al. | 707/3 |
| 6,457,028 | B1 | 9/2002 | Pitkow et al. | 707/513 |
| 6,476,828 | B1 | 11/2002 | Burkett et al. | 345/760 |
| 6,499,026 | B1 | 12/2002 | Rivette et al. | 707/2 |
| 6,604,114 | B1 | 8/2003 | Toong et al. | 707/104.1 |
| 6,674,450 | B1 | 1/2004 | Toub et al. | 345/749 |
| 6,691,108 | B2 | 2/2004 | Li | 707/3 |
| 6,694,331 | B2 | 2/2004 | Lee | 707/104.1 |
| 6,701,524 | B1 | 3/2004 | Okamura et al. | 725/37 |
| 6,728,725 | B2 | 4/2004 | Garfield et al. | 707/102 |
| 6,738,780 | B2 | 5/2004 | Lawrence et al. | 707/101 |
| 6,795,089 | B2 | 9/2004 | Rajarajan et al. | 345/629 |
| 6,799,176 | B1 | 9/2004 | Page | 707/5 |
| 6,816,870 | B1 | 11/2004 | Nishimura et al. | 707/104.1 |
| 6,868,528 | B2 | 3/2005 | Roberts | 715/853 |
| 6,879,990 | B1* | 4/2005 | Boyer et al. | 707/205 |
| 6,886,010 | B2 | 4/2005 | Kostoff | 707/3 |
| 6,952,806 | B1 | 10/2005 | Card et al. | 715/802 |
| 7,019,741 | B2 | 3/2006 | Kelly et al. | 345/419 |
| 7,035,864 | B1 | 4/2006 | Ferrari et al. | 707/102 |
| 7,050,056 | B2 | 5/2006 | Meyringer | 345/440 |
| 7,062,483 | B2 | 6/2006 | Ferrari et al. | 707/3 |
| 7,080,325 | B2 | 7/2006 | Treibach-Heck et al. | 715/780 |
| 7,117,198 | B1 | 10/2006 | Cronin et al. | 707/3 |
| 7,158,878 | B2 | 1/2007 | Rasmussen et al. | 701/208 |
| 7,185,001 | B1 | 2/2007 | Burdick et al. | 707/3 |
| 7,194,691 | B1 | 3/2007 | Zilka et al. | 715/739 |
| 7,231,386 | B2 | 6/2007 | Nonomura et al. | 707/3 |
| 7,296,015 | B2* | 11/2007 | Poltorak | 707/707 |
| 7,305,625 | B1 | 12/2007 | Zilka et al. | 715/739 |
| 7,325,201 | B2 | 1/2008 | Ferrari et al. | 715/737 |
| 7,433,884 | B2 | 10/2008 | Breitzman | 707/102 |
| 7,555,725 | B2 | 6/2009 | Abramson et al. | 715/781 |
| 7,567,957 | B2 | 7/2009 | Ferrari et al. | 707/3 |
| 2001/0016840 | A1 | 8/2001 | Hijikata et al. | 707/1 |
| 2001/0027452 | A1 | 10/2001 | Tropper | 707/3 |
| 2002/0007373 | A1 | 1/2002 | Blair et al. | 707/505 |
| 2002/0013112 | A1* | 1/2002 | Bontaites et al. | 442/381 |
| 2002/0023077 | A1 | 2/2002 | Nguyen et al. | 707/1 |
| 2002/0035499 | A1 | 3/2002 | Germeraad et al. | 705/9 |
| 2002/0035571 | A1 | 3/2002 | Coult | 707/104.1 |
| 2002/0051020 | A1 | 5/2002 | Ferrari et al. | 345/854 |
| 2002/0083039 | A1 | 6/2002 | Ferrari et al. | 707/1 |
| 2002/0093528 | A1 | 7/2002 | Grainger | 345/738 |
| 2002/0099700 | A1 | 7/2002 | Li | 707/5 |
| 2002/0156760 | A1 | 10/2002 | Lawrence et al. | 707/1 |
| 2002/0167543 | A1 | 11/2002 | Smith et al. | 345/762 |
| 2002/0174271 | A1 | 11/2002 | Tanigawa et al. | 710/11 |
| 2003/0001873 | A1 | 1/2003 | Garfield et al. | 345/700 |
| 2003/0004936 | A1* | 1/2003 | Grune et al. | 707/3 |
| 2003/0033295 | A1 | 2/2003 | Adler et al. | 707/3 |
| 2003/0074351 | A1 | 4/2003 | van Stegeren et al. | 707/3 |
| 2003/0172020 | A1 | 9/2003 | Davies et al. | 705/36 |
| 2003/0187832 | A1* | 10/2003 | Reader | 707/3 |
| 2003/0229470 | A1 | 12/2003 | Pejic | 702/179 |
| 2004/0015481 | A1 | 1/2004 | Zinda | 707/1 |
| 2004/0093561 | A1 | 5/2004 | Yeh et al. | 715/513 |
| 2004/0103112 | A1 | 5/2004 | Colson et al. | 707/102 |
| 2004/0119713 | A1 | 6/2004 | Meyringer | 345/440 |
| 2004/0123235 | A1 | 6/2004 | Yeh et al. | 715/513 |
| 2004/0125149 | A1 | 7/2004 | Lapidous | 345/808 |
| 2004/0133433 | A1 | 7/2004 | Lee et al. | 705/1 |
| 2004/0133555 | A1 | 7/2004 | Toong et al. | 707/2 |
| 2004/0148375 | A1 | 7/2004 | Levett et al. | 709/223 |
| 2004/0181427 | A1 | 9/2004 | Stobbs et al. | 705/1 |
| 2004/0201618 | A1 | 10/2004 | Alderson | 345/744 |
| 2005/0028105 | A1 | 2/2005 | Musson et al. | 715/744 |
| 2005/0097189 | A1 | 5/2005 | Kashi | 709/217 |
| 2005/0120026 | A1 | 6/2005 | Lee et al. | 707/10 |
| 2005/0182755 | A1 | 8/2005 | Tran | 707/3 |
| 2005/0192968 | A1 | 9/2005 | Beretich, Jr. et al. | 707/10 |
| 2005/0210008 | A1 | 9/2005 | Tran et al. | 707/3 |
| 2005/0210042 | A1* | 9/2005 | Goedken | 707/100 |
| 2005/0270311 | A1 | 12/2005 | Rasmussen et al. | 345/677 |
| 2006/0053104 | A1 | 3/2006 | Ferrari et al. | 707/3 |
| 2006/0074867 | A1 | 4/2006 | Breitzman | 707/3 |
| 2006/0112085 | A1* | 5/2006 | Zijlstra et al. | 707/3 |
| 2006/0168547 | A1 | 7/2006 | Boyles et al. | 715/854 |
| 2006/0224972 | A1 | 10/2006 | Albrecht et al. | 715/760 |
| 2006/0224974 | A1 | 10/2006 | Albrecht et al. | 715/760 |
| 2006/0224975 | A1 | 10/2006 | Albrecht et al. | 715/760 |
| 2006/0224979 | A1* | 10/2006 | Albrecht et al. | 715/760 |
| 2006/0224980 | A1 | 10/2006 | Albrecht et al. | 715/760 |
| 2006/0224982 | A1 | 10/2006 | Albrecht et al. | 715/764 |
| 2006/0224983 | A1 | 10/2006 | Albrecht et al. | 715/764 |
| 2006/0224984 | A1 | 10/2006 | Albrecht et al. | 715/764 |
| 2006/0224999 | A1 | 10/2006 | Albrecht et al. | 715/853 |
| 2006/0225000 | A1 | 10/2006 | Albrecht et al. | 715/853 |
| 2007/0016565 | A1* | 1/2007 | Evans et al. | 707/3 |
| 2007/0083505 | A1 | 4/2007 | Ferrari et al. | 707/5 |
| 2008/0005103 | A1* | 1/2008 | Ratcliffe et al. | 707/5 |
| 2008/0134060 | A1 | 6/2008 | Albrecht et al. | 715/762 |
| 2008/0162329 | A1* | 7/2008 | Knapp et al. | 705/37 |
| 2008/0222504 | A1* | 9/2008 | Chitturi | 715/201 |
| 2008/0228726 | A1* | 9/2008 | Huang et al. | 707/3 |
| 2009/0007273 | A1* | 1/2009 | Kim et al. | 726/26 |
| 2009/0070297 | A1* | 3/2009 | Hadzima et al. | 707/3 |
| 2009/0083109 | A1* | 3/2009 | Frank et al. | 705/8 |

OTHER PUBLICATIONS

Office Action, mailed Jun. 26, 2008 in related matter U.S. Appl. No. 11/096,563, 23 pages.

Final Office Action, mailed Aug. 5, 2008 in related matter U.S. Appl. No. 11/096,931, 38 pages.

Final Office Action, mailed Aug. 5, 2008 in related matter U.S. Appl. No. 11/096,905, 36 pages.

Final Office Action, mailed Aug. 5, 2008 in related matter U.S. Appl. No. 11/096,914, 35 pages.

Final Office Action, mailed Jul. 25, 2008 in related matter U.S. Appl. No. 11/096,902, 26 pages.

Final Office Action, mailed Aug. 18, 2008 in related matter U.S. Appl. No. 11/096,371, 37 pages.

Final Office Action, mailed Jul. 17, 2008 in related matter U.S. Appl. No. 11/096,564, 25 pages.

Office Action, mailed Aug. 15, 2008 in related matter U.S. Appl. No. 11/096,561, 30 pages.

Japan Patent Office, Guide Book for Practical Use of "Patent Map for Each Technology Field," http://www.toryod.com/pdf/patent_map_JPO.pdf, 2000, 48 pages.

Office Action, mailed Mar. 13, 2006 in related matter U.S. Appl. No. 10/624,918, 91 pages.

Amendment filed Jul. 13, 2006 in related matter U.S. Appl. No. 10/624,918, 16 pages.

Final Office Action, mailed Aug. 28, 2006 in related matter U.S. Appl. No. 10/624,918, 33 pages.

Preliminary Amendment and RCE filed Feb. 27, 2007 in related matter U.S. Appl. No. 10/624,918, 22 pages.

Office Action, mailed May 4, 2007 in related matter U.S. Appl. No. 10/624,918, 36 pages.

Petition and Amendment filed Nov. 5, 2007 in related matter U.S. Appl. No. 10/624,918, 29 pages.

Preliminary Amendment filed Apr. 13, 2007 in related matter U.S. Appl. No. 11/611,816, 5 pages.

"Dynamic HTML and XML: the XMLHttpRequest Object. Web Content" Apr. 6, 2006, Apple Developer Connection, [retrieved on Jan. 15, 2008] retrieved from Apple developer Connection using web.archive.org, http://web.archive.org/web/20040606034742/%20http://developer.apple.com//%20http://developer.apple.com/internet/webcontent/xmlhttppreq.html, 4 pages.

Garrett, Jesse James, "Ajax: A New Approach to Web Applications" Adaptive Path, Essay [online], Feb. 19, 2005. [retrieved on Jun. 16, 2008] http://www.adaptivepath.com/ideas/essays/archives/000385.php, 5 pages.

BNET, "Cas Announces Addition of Patent Family Information", http://findarticles.com/mi mOBNO/is 1019?pnum=2&opq=53057006, Oct. 1, 1998, 2 pages.

Minesoft, "Patent Family Portal", http://www.minesoft.com/patent family portal.asp, Copyright 1996-2008 Minesoft Ltd., 1 page.

"Announcing FamPat, a New International Patent Database from Questel Orbit," http://newsbreaks.infotoday.com/nbreader.asp?ArticleID=16267, Posted Feb. 14, 2005, 2 pages.

"Delphion Citation Link Analytical Tool for Patent Research," http://www.delphion.com/products/research/products-citelink, Copyright 1997-2008, 2 pages.

MicroPatent, Your Full-Service IP Solutions Provider, http://www.micropat.com/static/advanced.htm, Copyright Advanced Patent Analysis, 2005 MicroPatent, 6 pages.

Brockhoff, "Indicators of Firm Patent Activities, Technology Management: the New International Language", 27-31 (Oct. 1991), ISBN: 0-7803-0161-7 PP-476-782, 6 pages.

Consens, et al., "Architecture and Applications of the HY+Visualization System" *IBM Systems Journal*, IBM Corp. Armonk, New York, US; vol. 33, No. 3, 1994, pp. 458-476, 19 pages.

Montes De Oca C., et al., "A visual representation model for software subsystem decomposition", 1998, 10 pages.

Proceedings. Fifth Working Conference on *Reverse Engineering*, Honolulu, HI, USA, Oct. 12-14, 1998, Los Alamitos, CA, USA, IEEE Computer Soc., US., Oct. 12, 1998, 12 pages.

Assa J., et al., "Displaying data in multidimensional relevance space with 2D visualization maps" *Proceedings Visualization '97*-Phoenix, AZ, Oct. 19-24, 1997, Annual IEEE Conference on Visualization, Los Alamitos, CA; IEEE Computer Soc., US, vol. Conf. 8, Oct. 19, 1997, 8 pages.

Office action, mailed Jan. 22, 2008 in related matter U.S. Appl. No. 11/096,562, 26 pages.

Response to Office action mailed Jan. 22, 2008, filed Apr. 22, 2008 in related matter U.S. Appl. No. 11/096,562, 15 pages.

Office action, mailed Mar. 19, 2008 in related matter U.S. Appl. No. 11/097,432, 31 pages.

Office Action mailed Dec. 26, 2007 in related matter U.S. Appl. No. 11/096,563, 25 pages.

Responses to Office Action mailed Dec. 26, 2007, filed Mar. 21, 2008 in related matter U.S. Appl. No. 11/096,563, 17 pages.

Office action, mailed Feb. 20, 2008 in related matter U.S. Appl. No. 11/096,931, 24 pages.

Response to Office action mailed Feb. 20, 2008, filed May 21, 2008 in related matter U.S. Appl. No. 11/096,931, 17 pages.

Office action, mailed Feb. 5, 2008 in related matter U.S. Appl. No. 11/096,905, 24 pages.

Response to office action mailed Feb. 5, 2008, filed May 5, 2008 in related matter U.S. Appl. No. 11/096,905, 15 pages.

Office action mailed Feb. 5, 2008 in related matter U.S. Appl. No. 11/096,914, 25 pages.

Response to Office action mailed Feb. 5, 2008, filed May 5, 2008 in related matter U.S. Appl. No. 11/096,914, 41 pages.

Office action, mailed Jan. 23, 2008 in related matter U.S. Appl. No. 11/096,902, 24 pages.

Response to Office action mailed Jan. 23, 2008, filed Apr. 23, 2008 in related matter U.S. Appl. No. 11/096,902, 15 pages.

Office action mailed Dec. 12, 2007 in related matter U.S. Appl. No. 11/096,371, 27 pages.

Response to Office action, mailed Dec. 12, 2008, filed Mar. 12, 2008 in related matter U.S. Appl. No. 11/096,371, 17 pages.

Office action, mailed Mar. 11, 2008 in related matter U.S. Appl. No. 11/097,569, 23 pages.

Response to Office action mailed Mar. 11, 2008, filed Jun. 11, 2008 in related matter U.S. Appl. No. 11/097,569, 17 pages.

Office action, mailed Jan. 23, 2008 in related matter U.S. Appl. No. 11/096,564, 24 pages.

Response to Office action mailed Jan. 23, 2008, filed Apr. 23, 2008 in related matter U.S. Appl. No. 11/096,564, 16 pages.

Office action, mailed Mar. 20, 2008 in related matter U.S. Appl. No. 11/097,431, 22 pages.

Response to Office action mailed Mar. 20, 2008, filed Jun. 20, 2008 in related matter U.S. Appl. No. 11/097,431, 18 pages.

Office action, mailed Mar. 3, 2008 in related matter U.S. Appl. No. 11/097,571, 30 pages.

Response to Office action mailed Mar. 3, 2008, filed Jun. 3, 2008 in related matter U.S. Appl. No. 11/097,571, 19 pages.

Office action, mailed Mar. 11, 2008 in related matter U.S. Appl. No. 11/097,570, 28 pages.

Application filed Apr. 1, 2005 in related matter U.S. Appl. No. 11/096,386, 93 pages.

Office action, mailed Feb. 20, 2008 in related matter U.S. Appl. No. 11/096,561, 25 pages.

Response to Office action mailed Feb. 20, 2008, filed May 20, 2008 in related matter U.S. Appl. No. 11/096,561, 19 pages.

Final Office action, mailed Aug. 5, 2008 in related matter U.S. Appl. No. 11/096,562, 39 pages.

Response After Final filed Nov. 5, 2008 in related matter U.S. Appl. No. 11/096,562, 15 pages.

Response After Final filed Nov. 5, 2008 in related matter U.S. Appl. No. 11/096,931, 17 pages.

Amendment After Final filed Nov. 5, 2008 in related matter U.S. Appl. No. 11/096,905, 14 pages.

Advisory Action mailed Nov. 14, 2008 in related matter U.S. Appl. No. 11/096,905, 4 pages.

RCE and Amendment filed Jan. 5, 2009 in related matter U.S. Appl. No. 11/096,905, 22 pages.

Final Office action mailed Aug. 18, 2008 in related matter U.S. Appl. No. 11/096,371, 37 pages.

Response filed Sep. 29, 2008 in related matter U.S. Appl. No. 11/097,569, 12 pages.

Final Office action mailed Dec. 23, 2008 in related matter U.S. Appl. No. 11/097,569, 32 pages.

RCE and Amendment filed Jan. 13, 2009 in related matter U.S. Appl. No. 11/097,569, 19 pages.

Office action mailed Feb. 20, 2009 in related matter U.S. Appl. No. 11/097,569, 28 pages.

Amendment After Final filed Oct. 14, 2008 in related matter U.S. Appl. No. 11/096,564, 13 pages.

Advisory Action mailed Nov. 6, 2008 in related matter U.S. Appl. No. 11/096,564, 12 pages.

RCE and Amendment filed Dec. 17, 2008 in related matter U.S. Appl. No. 11/096,564, 20 pages.

Office action mailed Feb. 23, 2009 in related matter U.S. Appl. No. 11/096,564, 30 pages.

Office action, mailed Aug. 29, 2008 in related matter U.S. Appl. No. 11/097,431, 30 pages.

Office action, mailed Sep. 4, 2008 in related matter U.S. Appl. No. 11/097,571, 30 pages.

Response filed Dec. 4, 2008 in related matter U.S. Appl. No. 11/097,571, 11 pages.

Final Office action mailed Mar. 4, 2009 in related matter U.S. Appl. No. 11/097,571, 32 pages.

Response filed May 20, 2008 in related matter U.S. Appl. No. 11/096,931, 17 pages.

Office action, mailed Sep. 10, 2008 in related matter U.S. Appl. No. 11/096,386, 32 pages.

Response filed Dec. 10, 2008 in related matter U.S. Appl. No. 11/096,386, 18 pages.

Final Office action mailed Mar. 2, 2009 in related matter U.S. Appl. No. 11/096,386, 30 pages.

Response filed Nov. 17, 2008 in related matter U.S. Appl. No. 11/096,561, 13 pages.

Final Office Action mailed Feb. 4, 2009, in related matter U.S. Appl. No. 11/096,561, 36 pages.
Final Office Action mailed Sep. 11, 2008 in related matter U.S. Appl. No. 10/624,918, 31 pages.
Amendment After Final filed Dec. 11, 2008, in related matter U.S. Appl. No. 10/624,918, 15 pages.
Decision on Petition mailed Dec. 15, 2008, in related matter U.S. Appl. No. 10/624,918, 1 page.
Advisory Action mailed Dec. 19, 2008, in related matter U.S. Appl. No. 10/624,918, 3 pages.
Amendment and RCE filed Jan. 8, 2009 in related matter U.S. Appl. No. 10/624,918, 21 pages.
Office action mailed Mar. 9, 2009 in related matter U.S. Appl. No. 10/624,918, 38 pages.
Office action, mailed Apr. 2, 2009 in related matter U.S. Appl. No. 11/611,816, 24 pages.
Amendment After Final filed Apr. 23, 2009 in related matter U.S. Appl. No. 11/096,564, 62 pages.
Response filed Sep. 29, 2008 in co-pending U.S. Appl. No. 11/097,570, 18 pages.
Office action, mailed Sep. 4, 2008 in related matter U.S. Appl. No. 11/097,432, 32 pages.
Amendment After Final filed Nov. 4, 2008, in related matter U.S. Appl. No. 11/097,432, 11 pages.
Advisory Action mailed Nov. 14, 2008 in related matter U.S. Appl. No. 11/097,432, 4 pages.
RCE and Amendment filed Jan. 5, 2009, in related matter U.S. Appl. No. 11/097,432, 17 pages.
Office Action mailed Mar. 4, 2009 in related matter U.S. Appl. No. 11/097,432, 26 pages.
Advisory Action mailed Nov. 14, 2008 in co-pending U.S. Appl. No. 11/096,562, 6 pages.
Amendment filed Oct. 27, 2008 in co-pending U.S. Appl. No. 11/096,563, 14 pages.
Office action, mailed Aug. 15, 2008 in related matter U.S. Appl. No. 11/096,561 30 pages.
Office action, mailed Jan. 8, 2009 in co-pending U.S. Appl. No. 11/096,563, 33 pages.
Amendment filed May 7, 2009 in co-pending U.S. Appl. No. 11/097,432, 66 pages.
Advisory action mailed Nov. 14, 2008 in co-pending U.S. Appl. No. 11/096,931, 4 pages.
Office action mailed Mar. 18, 2009 in co-pending U.S. Appl. No. 11/096,905, 25 pages.
Examiner's Interview Summary mailed Jun. 2, 2009 in co-pending U.S. Appl. No. 11/096,905, 2 pages.
Amendment After Final filed Jun. 15, 2009 in co-pending U.S. Appl. No. 11/096,905, 17 pages.
Amendment After Final filed Nov. 5, 2008 in co-pending U.S. Appl. No. 11/096,914, 27 pages.
Advisory action mailed Nov. 14, 2008 in co-pending U.S. Appl. No. 11/096,914, 4 pages.
Amendment After Final filed Oct. 27, 2008 in co-pending U.S. Appl. No. 11/096,902, 14 pages.
Advisory action mailed Nov. 13, 2008 in co-pending U.S. Appl. No. 11/096,902, 7 pages.
Amendment After Final filed Nov. 17, 2008 in co-pending U.S. Appl. No. 11/096,371, 15 pages.
Advisory action mailed Nov. 25, 2008 in co-pending U.S. Appl. No. 11/096,371, 15 pages.
RCE and Amendment filed Dec. 18, 2008 in co-pending U.S. Appl. No. 11/096,371, 23 pages.
Office action mailed Feb. 4, 2009 in co-pending U.S. Appl. No. 11/096,371, 31 pages.
Final Office action mailed Aug. 5, 2009 in co-pending U.S. Appl. No. 11/096,564, 26 pages.
Final Office action mailed Aug. 5, 2009 in co-pending U.S. Appl. No. 11/097,432, 28 pages.
Amendment After Final filed Dec. 1, 2008 in co-pending U.S. Appl. No. 11/097,431, 14 pages.
Advisory action mailed Dec. 12, 2008 in co-pending U.S. Appl. No. 11/097,431, 4 pages.
Interview Summary mailed May 15, 2009 in co-pending U.S. Appl. No. 10/624,918, 18 pages.
Amendment filed Jun. 9, 2009 in co-pending U.S. Appl. No. 10/624,918, 18 pages.
Response filed Jun. 19, 2008 in related matter U.S. Appl. 11/097,432, 17 pages.
Response to Office action mailed Mar. 11, 2008, filed Jun. 11, 2008 in related matter U.S. Appl. 11/097,570, 16 pages.
Response to Office action mailed Mar. 19, 2008, filed Jun. 12, 2008 in related matter U.S. Appl. 11/097,432, 17 pages.
Archive.org, Patent Collection Descriptions, Delphion, http://web.archive.org_web_20010504033108_http_www.delphion.com_boolquery_collect_descrip, May 4, 2001, 3 pages.
European Patent Office, Supplemental European Search Report, European Application No. EP 99965107, completed Mar. 3, 2004, 2 pages.
International Searching Authority, International Search Report, International Application No. PCT/US99/28657, completed Feb. 22, 2000, mailed Mar. 17, 2000, 4 pages.
Garner, et al. "Three Drexel Information Science Research Studies," Drexel Press, 1967, 54 pages.
Garfield, E., "Historiographs, Librarianship and the History of Science," *Essays of an Information Scientist*, vol. 2, pp. 136-150, Sep. 18, 1974, 15 pages.
Albert, et al., "Direct Validation of Citation Counts as Indicators of Industrially Important Patents," Research Policy, vol. 20, Dec. 1990, pp. 251-259, 9 pages.
Fruchterman, et al., "Graph Drawing by Force-directed Placement," Software—Practice and Experience, vol. 21, No. 11m, pp. 1129-1164, Nov. 1991, 36 pages.
Tunkelang, "A Practical Approach to Drawing Undirected Graphs", Report CMUCS-94-161, School of Computer Science, Carnegie Mellon University, Jun. 1994, 31 pages.
Coleman, M.K., et al., "Aesthetics-based Graph Layout for Human Consumption," Software—Practice and Experience, University of California, Los Angeles, 1993, 111 pages.
Hall, et al., "Market Value and Patent Citations: A First Look", Conference on Intangibles and Capital Markets, May 2000, 63 pages.
Narin, F., "Tech-Line® Background Paper," CHI Research, Inc., Aug. 19, 1998, 40 pages.
Aurigin, "How to Gain an Advantage in IP Licensing," Slide Presentation, Mar. 4, 1999, 28 pages.
Aurigin, "Aureka 7.0," Product Brochure, 1999, 6 pages.
esp@cenet, "Patent families", http://ep.espacenet.com/help?topic=patentfamily&method=handleHelpTopic&locale=en_ep, Mar. 14, 2012, 1 page.
LexisNexis, Lexis Nexis, "Source Information", http://w3.nexis.com/sources/scripts/info.pl?170296, copyright 2012 LexisNexis, a division of Reed Elsevier Inc., 2 pages.
Goodman, D., *JavaScript & DHTML Cookbook*, O'Reilly [via Safari Books Online], Apr. 21, 2003, http://proquest.safaribooksonline.com/0596004672.
Breitzman et al., "The Many Applications of Patent Analysis", Journal of Information Science, vol. 28, No. 3, Feb. 4, 2002, pp. 187-205.
Carpenter, et al., "Citation Rates to Technologically Important Patents," World Patent Information, vol. 3, No. 4, 1981, pp. 160-163.

* cited by examiner

*FIG. 2*

PRIOR ART

*FIG. 3*

PRIOR ART

APPARATUS AND METHOD FOR PERFORMING ANALYSES ON DATA DERIVED FROM A WEB-BASED SEARCH ENGINE

RELATED APPLICATIONS

This application is a continuation in part of each of the following U.S. patent applications: application Ser. Nos. 11/096,562, 11/096,563, 11/097,432, 11/096,931, 11/096,905, 11/096,914, 11/096,902, 11/096,371, 11/097,569, 11/096,564, 11/097,431, 11/097,571, 11/097,570, 11/096,386, 11/096,561—all such applications filed Apr. 1, 2005. This application is also a continuation in part of U.S. patent application Ser. No. 10/624,918 filed Jul. 22, 2003, which claims priority from provisional application Ser. No. 60/397,542 filed Jul. 22, 2002, and of U.S. patent application Ser. No. 11/532,092 filed Sep. 14, 2006. Each of the patent applications identified in this paragraph has one or more inventors in common with the inventors herein, and is also hereby incorporated herein by reference. In addition, each of U.S. Pat. Nos. 7,171,405 and 6,604,114, which have one or more inventors in common with the inventors herein, is hereby incorporated herein by reference.

TECHNICAL FIELD

The present invention relates to web-based search engines, and more particularly to apparatus and methods for performing analyses on data derived from a web-based search engine.

BACKGROUND ART

It is known in the prior art to utilize web-based search engines to access information. Web search engines such as Google and Yahoo have traditionally focused in the area of generalized search of websites and other content on the internet, typically for consumers and businesses looking for information on the World Wide Web. The strengths of such leading search engines include:
  the breadth of their databases of web information (i.e. their comprehensiveness),
  the high speed at which they return search results, and
  the fact that there is usually something of relevance/interest to the user in the search result list returned.
  Limitations of Generalized Web Search Engines. Google is one of the leading web search sites and for this discussion we will discuss Google as being representative of what search sites do and do not do well. For generalized search for access to websites and information on the WWW, it is not necessary that the Google search return all relevant information, only enough hits that are relevant to the user. It is also not necessary for the user to be able to store the results list for further access (you can always fire off another Google search) or to retrieve a specific list in order to do further analysis.
  Because Google usually returns something of relevance, it is rare that a user will look beyond the few pages of search results. In fact in many cases the user does not go past the first page and often the top few entries on the first page are "good enough" for casual use. This approach limits the universe of information which is practically available to the Google search user.
  Specialized Search Engines. Google has introduced more specialized databases in recent years. For example:
  Google Scholar, which Google describes as follows: "Google Scholar provides a simple way to broadly search for scholarly literature. From one place, you can search across many disciplines and sources: peer-reviewed papers, theses, books, abstracts and articles, from academic publishers, professional societies, pre-print repositories, universities and other scholarly organizations. Google Scholar helps you identify the most relevant research across the world of scholarly research." http://scholar.google.com/intl/en/scholar/about.html
  Google Finance, which Google describes as follows: "Google Finance offers an easier way to search for stocks, mutual funds, public and private companies. Further, Google Finance also offers a broad range of company news and information in order to deliver more relevant, unbiased results in a clean, uncluttered user interface." http://www.google.com/googlefinance/faq.html#whatis
  Google Patent Search. Google introduced Google Patent Search in late 2006. http://www.google.com/patents. The Google Patent Search homepage (www.google.com/patents) presents a type of clean interface for which Google has become known. FIG. 1 illustrates a Google Patent Search (Beta) homepage. The user enters a search term or terms in the entry box and clicks "Search Patents". The result is a list of US patents, as illustrated in FIG. 2, which shows a Google Patents search results page. The user is given a limited set of options to display the results. One option is sorting by date (upper right side of the page). There is also a "sort by relevance" option, although it is not clear how this relevance is determined. If the user clicks on an entry in the patent list Google Patent returns the detail about that patent. FIG. 3 illustrates the Google Patents detail page. The layout is attractive and clean and the user can access information about the patent by clicking on the various hyperlinks provided. Google Patent Search presents nothing beyond these "search" and "display a patent" features. There is an "advanced search" page but all this does is allow the user to be more specific in his or her search terms—e.g. "nano" in the Title of the patent.

SUMMARY OF THE INVENTION

In one embodiment, the invention provides a computer-implemented method of performing patent analysis on data derived from a web-based search engine. In this embodiment, the method includes receiving a patent search query at a web-based search engine and operating the web-based search engine to make search results content available in response to the search query. The method of this embodiment also includes analyzing data associated with the search results content in a computer process according to criteria, specified by a user when specifying the search query, to produce analysis results. Finally, the method includes causing display, in a client digital computing device, of a web page in which the search results content is one element and the analysis results are another element. In a related embodiment, analyzing data associated with the search results content includes serving a web page, including both the search results content and analysis computer code, to the digital computing device, wherein the digital computing device is running a browser application that runs the analysis computer code to produce the analysis results and that displays the analysis results.
  In another embodiment, the invention provides a computer-implemented method of performing patent analysis on data derived from a web-based search engine pursuant to a search query. In this embodiment, the method includes causing display, in a first element of a patent analytics web page, in a digital computing device of search results content served by the search engine. In addition, the embodiment includes, in a first computer process, analyzing data associated with the search results content according to criteria, specified by a user when specifying the search query, to produce analysis results; and in a second computer process, causing display of the analysis results.

In a further related embodiment, the method additionally includes in a third computer process, causing display of advertisements based on the analysis results. Alternatively or in addition, the method includes, in a third computer process, causing display of advertisements based on at least one item included in at least one of the analysis results and the search results content. In another related embodiment, analyzing data in the first computer process includes analyzing data in the digital computing device and causing display in the second computer process of the analysis results includes causing display of the analysis results in the digital computing device. Alternatively, or in addition, analyzing data in the first computer process includes running in the digital computing device a script that has been embedded in the patent analytics web page. Optionally, causing display of the analysis results includes causing display of the analysis results in a second element of the patent analytics page. Optionally, the specified criteria include a histogram analysis of frequency of occurrence of an attribute of patents identified in the search results web page.

Optionally, the histogram analysis is selectable from among attributes including assignees, current assignees, and inventors of the patents. In another related embodiment, the specified criteria include a visual representation of a set of attributes of patents identified in the search results content. The visual representation may be a patent map or alternatively, may be of locations, on a geographic map, associated with an attribute of the patents identified in the search results content. The locations associated with the attribute, in turn, may be addresses of inventors of the patents identified in the search results content or business addresses of assignees of the patents identified in the search results content.

The locations may be identified by locator icons, wherein a locator icon characteristic selected from the group including icon selection, color, size, appearance, and shape indicates an attribute of the patents identified in the search results content. For example, addresses of all inventors listed in such patents and having a common assignee may be indicated on the geographic map by a locator icon having a common icon characteristic. More particularly, addresses of all inventors or assignees listed in such patents and having only expired patents may be indicated on the geographic map by a locator icon having a common icon characteristic. As another example, the address of each inventor or assignee listed in such patents and holding a plurality of patents may be indicated on the geographic map by a locator icon having a size that is a function of the number of patents held by such inventor or assignee. As yet another example, the address of each inventor or assignee listed in such patents may be indicated on the geographic map by a locator icon having a size that is a function of the imputed importance of patents held by such inventor or assignee.

In the foregoing embodiments involving the display of a patent map, the patent map may include lines indicating prior art citations. In a further related embodiment, the patent map is an interconnection map.

Any of the foregoing embodiments may provide user interactivity by further including, in a third computer process, responding to a user's graphical selection of an item in the second element by graphically identifying patents in the first element pertaining to such item.

In another embodiment, the invention provides a computer-implemented method of performing an analysis on data from a web-based search engine. In this embodiment, the method includes receiving over a network in a digital computing device from the web-based search engine a web page having content responsive to a query; such web page including analysis computer code executable, by the digital computing device, that performs the analysis; displaying the web page using a browser running in the digital computing device; and in displaying the web page, also running the analysis computer code in the browser of the digital computing device to perform the analysis so as to produce analysis results; and displaying the analysis results using the browser. In a further related embodiment, the analysis is of a type that is specified by a user when specifying the query, and wherein receiving over the network the web page includes receiving a web page having code that performs the specified type of analysis and running the computer code includes running code to perform the specified type of analysis. Alternatively or in addition, the method may include causing display of advertisements based on the analysis results. Alternatively or in addition, the method may include causing display of advertisements based on at least one item included in at least one of the analysis results and the search results content.

In another related embodiment, receiving the web page includes receiving the web page from an analysis server that acts as a proxy for the web-based search engine to obtain the content from the search engine and to cause inclusion of the code into the web page. Alternatively, receiving the web page includes receiving the web page directly from the web-based search engine, such search engine causing inclusion of the code into the web page.

In a further related embodiment, the analysis computer code includes computer code to receive and respond to a request for further analysis of the content. In this embodiment, the method further includes, in response to a user request for a further analysis of the content, running the analysis computer code in the browser of the digital computing device to cause the further analysis of the content and the display of the further analysis. Optionally, running the analysis computer code to cause the further analysis of the content includes issuing a request to a server for additional computer code, receiving from the server a web page including the additional computer code responsive to the request, and running the additional computer code in the browser in performing the further analysis. Alternatively or in addition, running the analysis computer code to cause the further analysis of the content includes issuing a request to a server for additional data, receiving from the server a web page including the additional data responsive to the request, and using the additional data in the browser in performing the further analysis.

In various embodiments, the method may additionally include displaying the analysis results simultaneously with the web page. Optionally, the method may include displaying the analysis results and the web page as elements of an analysis web page. In a further related embodiment, the method includes, in response to a user's graphical selection of an item in the analysis results, running the analysis computer code to cause graphical identification of search results corresponding to such item. In yet another further embodiment, receiving the web page includes receiving the web page from an analysis server that acts as a proxy for the web-based search engine to obtain the content from the search engine and causes inclusion of the code into the web page. Optionally, the method further includes displaying the analysis results simultaneously with the web page as elements of the analysis page. Also optionally, the method further includes using the computer code to issue a request for information supplementary to the content of the web page for use in performing the analysis; a further related embodiment includes directing the request to the analysis server. Also in further related embodiments, the web-based search engine identifies patents in response to the query and the analysis is of the patents identified in response to the query.

In yet another embodiment, the invention provides an apparatus for performing an analysis on data from a web-based search engine. In this embodiment, the apparatus includes a digital computing device. The digital computing device is in communication over a network with the web-based search engine, and is running a browser application operating in response to a web page having content received from the search engine responsive to the query. Moreover, the browser application is running analysis code, in the web page, that performs the analysis to produce analysis results, and the browser application causes display of the web page in the digital computing device.

In a related embodiment, the apparatus is for performing a type of analysis specified when the query is specified, and the browser application is running code that performs the specified type of analysis. Optionally, the analysis computer code includes computer code to receive and respond to a request for further analysis of the content and to cause the further analysis of the content and the display of the further analysis. In a further related embodiment, the analysis computer code includes computer code to cause issuance of a request to a server for additional computer code, such additional computer code, on being run in the browser application on receipt from the server of a web page responsive to the request, causing performance of the further analysis. Alternatively, or in addition, the analysis computer code includes computer code to cause issuance of a request to a server for additional data, such additional data, on becoming available on receipt from the server of a web page responsive to the request, being used by the analysis code in performing the further analysis.

Also optionally, the digital computing device is in communication with the web-based search engine through an analysis engine that acts as a proxy for the digital computing device in communicating with the search engine, to obtain the content from the search engine and to cause inclusion of the analysis computer code into the web page. Optionally, the web-based search engine identifies patents in response to the query and the analysis is of the patents identified in response to the query.

In another embodiment, the invention provides a computer-implemented method of performing an analysis on data from a web-based search engine. The method of this embodiment includes receiving over a network in a digital computing device from the web-based search engine a web page having search results content responsive to a query. Such content includes persons identified in relation items of content. The embodiment also includes analyzing the search results content so as to produce analysis results that include locations associated with the identified persons and displaying the locations on a geographic map as an element of a web page that also includes as an element thereof the search results content. In a further related embodiment, the locations are identified by locator icons, and a locator icon characteristic selected from the group including icon selection, color, size, appearance, and shape indicates an attribute of items of content identified in the search results content. In yet a further related embodiment, the items of content are patents.

BRIEF DESCRIPTION OF THE DRAWINGS

The foregoing features of the invention will be more readily understood by reference to the following detailed description, taken with reference to the accompanying drawings, in which:

Figure 2:
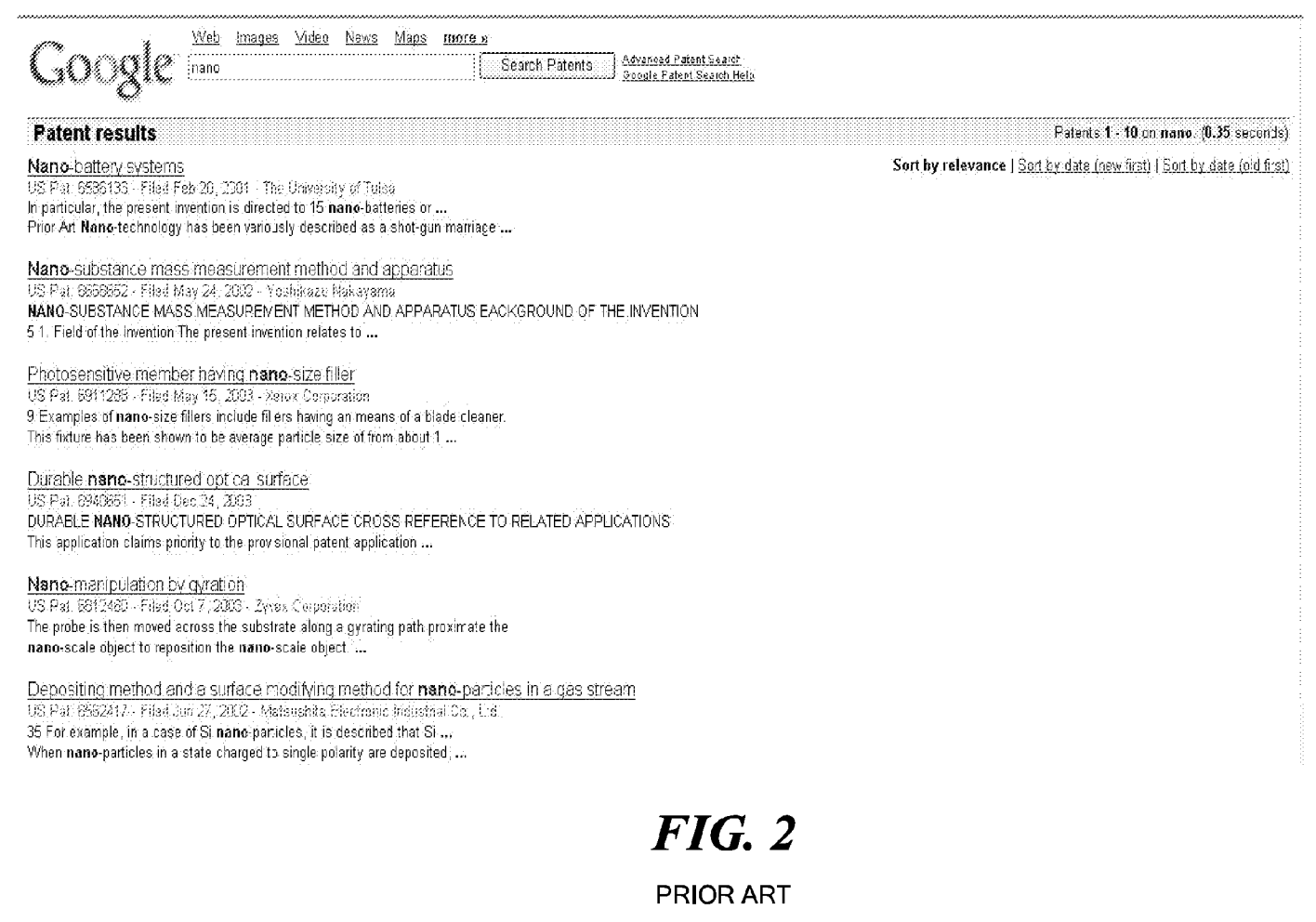

FIG. 2 (prior art) shows a Google Patents search results page;

Figure 3:
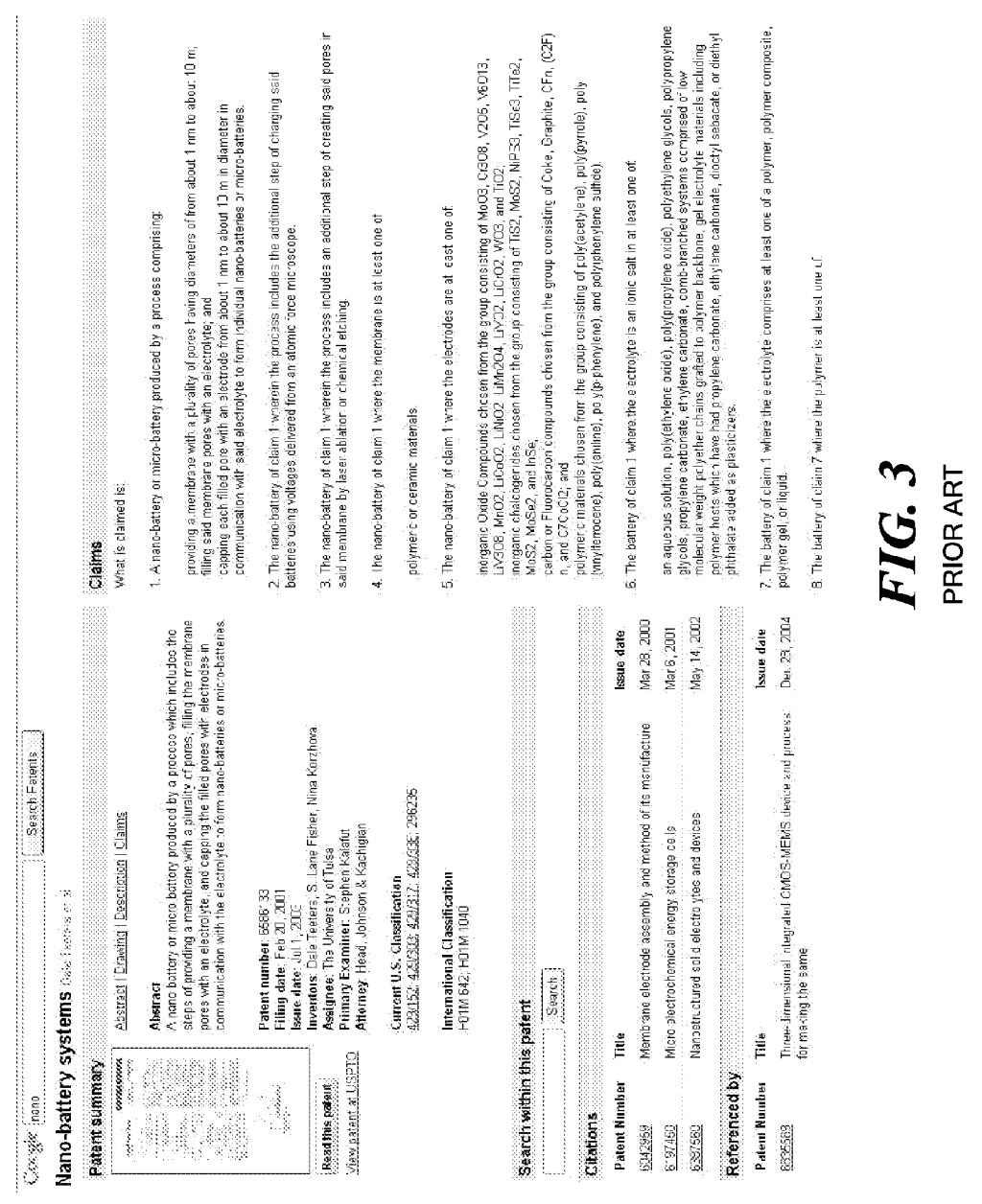

FIG. 3 (prior art) illustrates the Google Patents detail page;

FIG. 9 shows options available for analysis with respect to a particular patent in the listing of patents for a category in FIG. 8;

FIG. 13 shows details of the analysis results element of FIG. 7 when US Main Class Analysis has been specified;

FIG. 14 shows detail of a toolbar in the patent analytics web page in accordance with this embodiment wherein the user may specify, in addition to the criteria of FIG. 6, any one of a series of types of patent maps;

FIG. 18 shows a patent analysis web page in accordance with an embodiment of the present invention, in which, like the embodiment of FIGS. 6-11, an "assignee" analysis has been specified, displaying here search results for the string "congestive heart failure" and an assignee histogram;

FIG. 21 illustrates the effect of graphically selecting a specific pointer shown in the map of FIG. 20;

FIGS. 22-27 illustrate the use of an embodiment, similar to the embodiment of FIGS. 6-11, employing a specified assignee analysis, but here using one or more patent search engines to permit analysis of patent properties from multiple jurisdictions for the purpose of obtaining multi-jurisdictional information;

In FIG. 22, such an embodiment is utilized to specify as "Analysis type" a histogram showing patent assignees for a search of US patents for the term "RFID";

In FIG. 23, the embodiment is utilized to specify as "Analysis type" a histogram showing patent applicants for a search of Chinese patents for the term "RFID";

In FIG. 24, in a fashion analogous to the approach illustrated in FIG. 23, the embodiment is similarly utilized to specify as "Analysis type" a histogram showing patent applicants for a search of European patents for the term "RFID";

FIG. 25 shows an expansion of the histogram analysis in FIG. 22 to identify particular US patents assigned to a specific assignee;

FIG. 26 shows an expansion of the histogram analysis of FIG. 23 to identify particular Chinese patents issued to the same company as in FIG. 25;

FIG. 27 shows an expansion of the histogram analysis of FIG. 24 to identify particular European patents issued to the same company as in FIG. 25;

DETAILED DESCRIPTION OF SPECIFIC EMBODIMENTS

Definitions. As used in this description and the accompanying claims, the following terms shall have the meanings indicated, unless the context otherwise requires:

A "computer process" is any procedure or collection of procedures carried out by a digital computing device, and is not limited to a particular thread in an application.

A "digital computing device" is a device, having a central computing unit (CPU), an associated random access memory (RAM), and a display, that is capable of displaying a web page (as defined herein) and running a process, such as an applet or JavaScript, associated with the web page. A digital computing device includes a digital computer system with a browser application capable of executing an applet or JavaScript, as well as other internet-capable devices, such as a personal digital assistant (PDA) and an internet-capable mobile telephone, that can execute an applet or JavaScript.

A "geographic map" is a map showing one or more continents, or a portion of a continent.

A "patent property" is a patent or a patent application.

A "person" is a natural person or a juridical person, and therefore includes but is not limited to an individual, a corporation, a partnership, a limited liability company, a public agency, and a state or political subdivision thereof.

A "web page" is a digitally encoded visual representation that is displayable on a computing device using a browser application. A web page may, for example, be defined by HTML or Flash, but other digitally encoded visual representations may also be employed. A web page may, but need not, be delivered over the World Wide Web. A web page may include code, executable in a browser application, that performs functions other than displaying a visual representation. Our definition of "web page" herein expands on a more conventional understanding of this term.

We provide herein a description of an embodiment (sometimes called herein "IPVision Tools for Google Patent Search") that integrates the Google Patent Search website with tools for the analysis and display of patent information found through use of the Google Patent Search website. Although these features are presented in the specific context of patents, and the Google Patent Search website, the reader can appreciate that they have a much broader set of uses with other data and areas.

Figure 1:
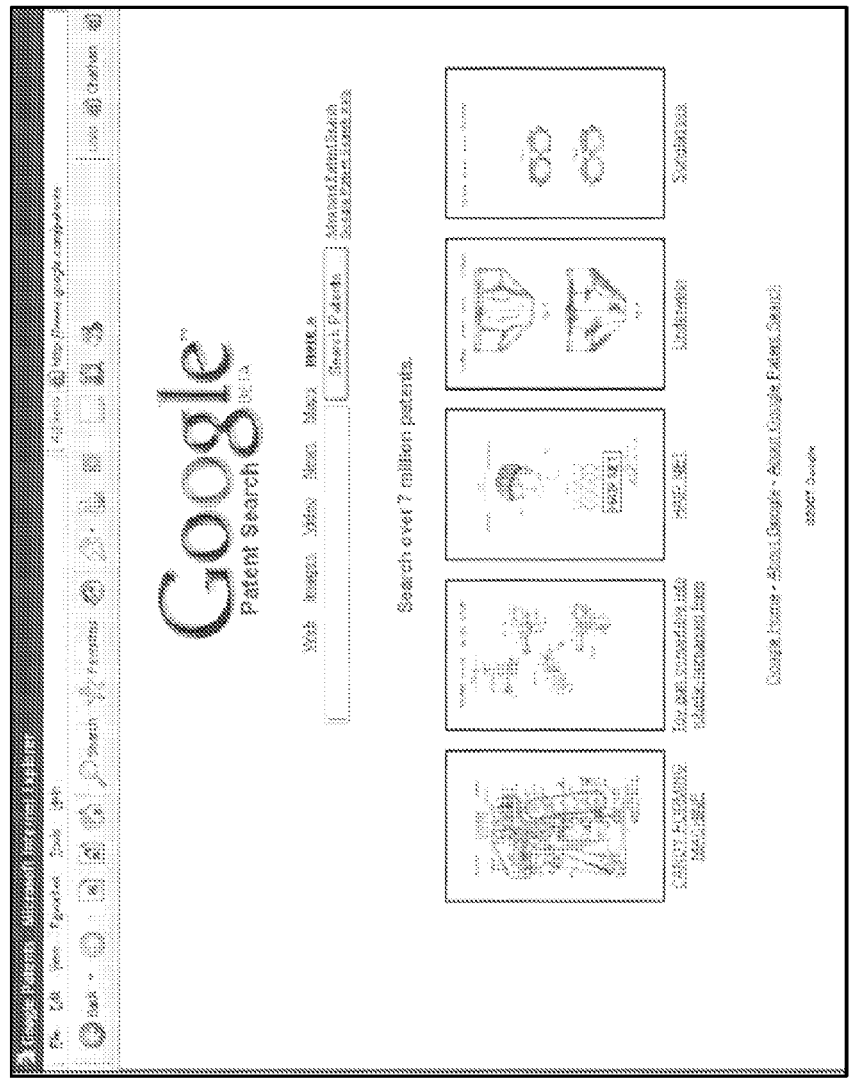
FIG. 1 (prior art) illustrates a Google Patent Search (Beta) homepage.
Figure 4:
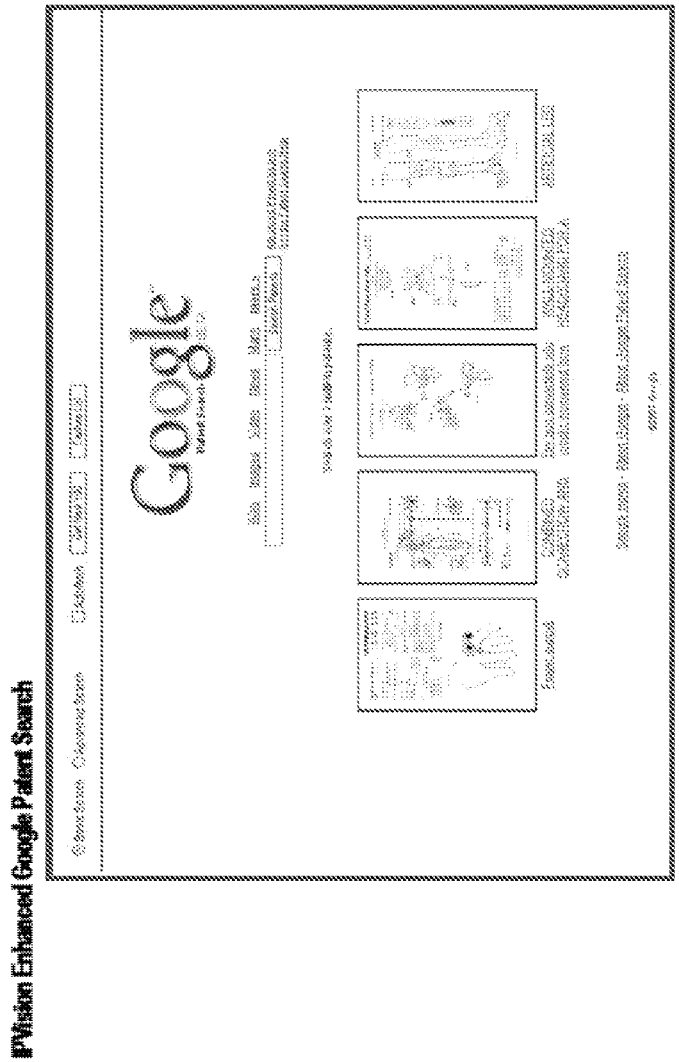
FIG. 4 illustrates an embodiment herein wherein a patent analytics web page displays, in an element, search web pages served by the Google Patent search engine.

The IPVision Tools for Google Patent Search uses a server that causes display of a patent analytics web page that in turn includes, in an element, the search web pages served by the Google Patent search engine. FIG. 4 illustrates an embodiment herein wherein a patent analytics web page displays, in an element, search web pages served by the Google Patent search engine.

As described in detail below, the search web pages served by the Google Patent search engine and caused to be displayed in the element include a search results web page. In one embodiment, scripts associated with the patent analytics web page extract relevant data from the search results web page, feed it to the patent analytics server to produce analysis results according to criteria that may be specified by the user when specifying the query and to cause display of the analysis results in a second element of the patent analytics web page.

Figure 5:
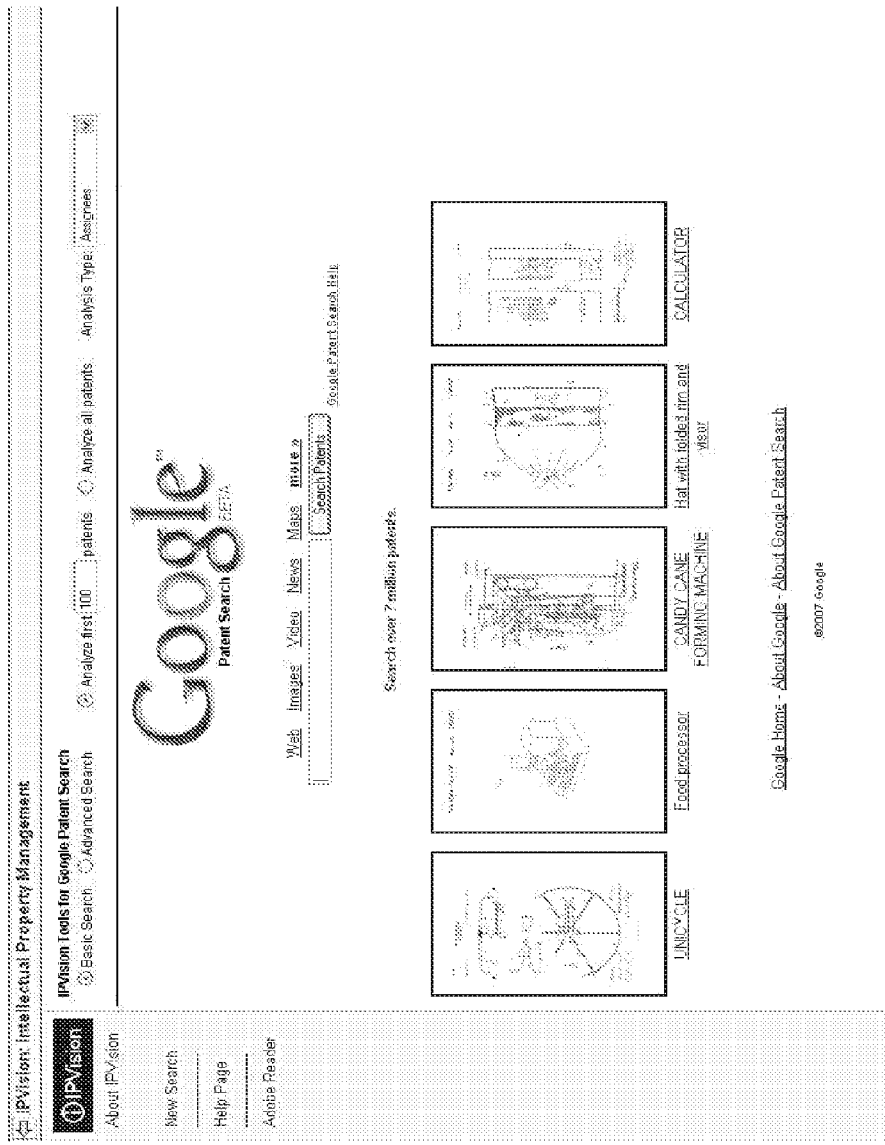
FIG. 5 illustrates a toolbar in the patent analytics web page, in accordance with an embodiment herein, for specifying criteria (at the time of specifying the query) for handling data from the search results output of the Google Patent search engine.
Figure 6:
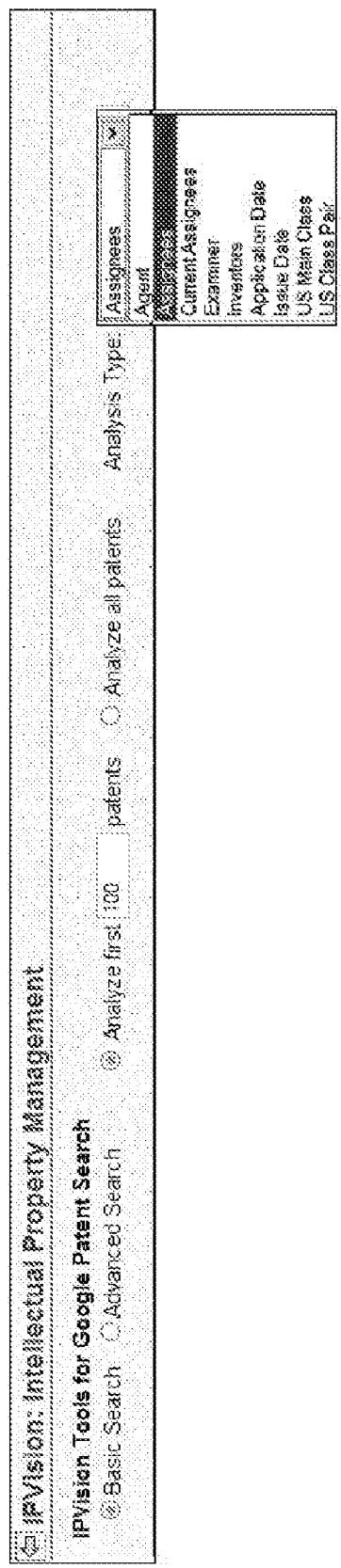
FIG. 6 shows detail of the toolbar of FIG. 5, and the criteria that may be specified.

The specified criteria for handling data from the search results output of the Google Patent search engine are provided via a toolbar in the patent analytics web page. FIG. 5 illustrates a toolbar in the patent analytics web page for specifying criteria for handling data from the search results output of the Google Patent search engine. FIG. 6 shows detail of the toolbar of FIG. 5, and the criteria that may be specified. It can be seen that the user may specify the "Number of Patents to Analyze" and the "Analysis Type". In the latter category, the type of analysis may be by Agent, Assignees, Current Assignees, Examiner, Inventors, Application Date, Issue Date, US Main Class, or US Class Pair. In addition to specifying criteria for handling data from the search results output of the Google Patent search engine, the user may specify the "Type of Search" (Basic or Advanced) to be performed by the Google Patent search engine itself; the designation of Type of Search is handed off as an input to the Google Patent search engine to cause appropriate triggering of its Basic or Advanced search capability.

Figure 7:
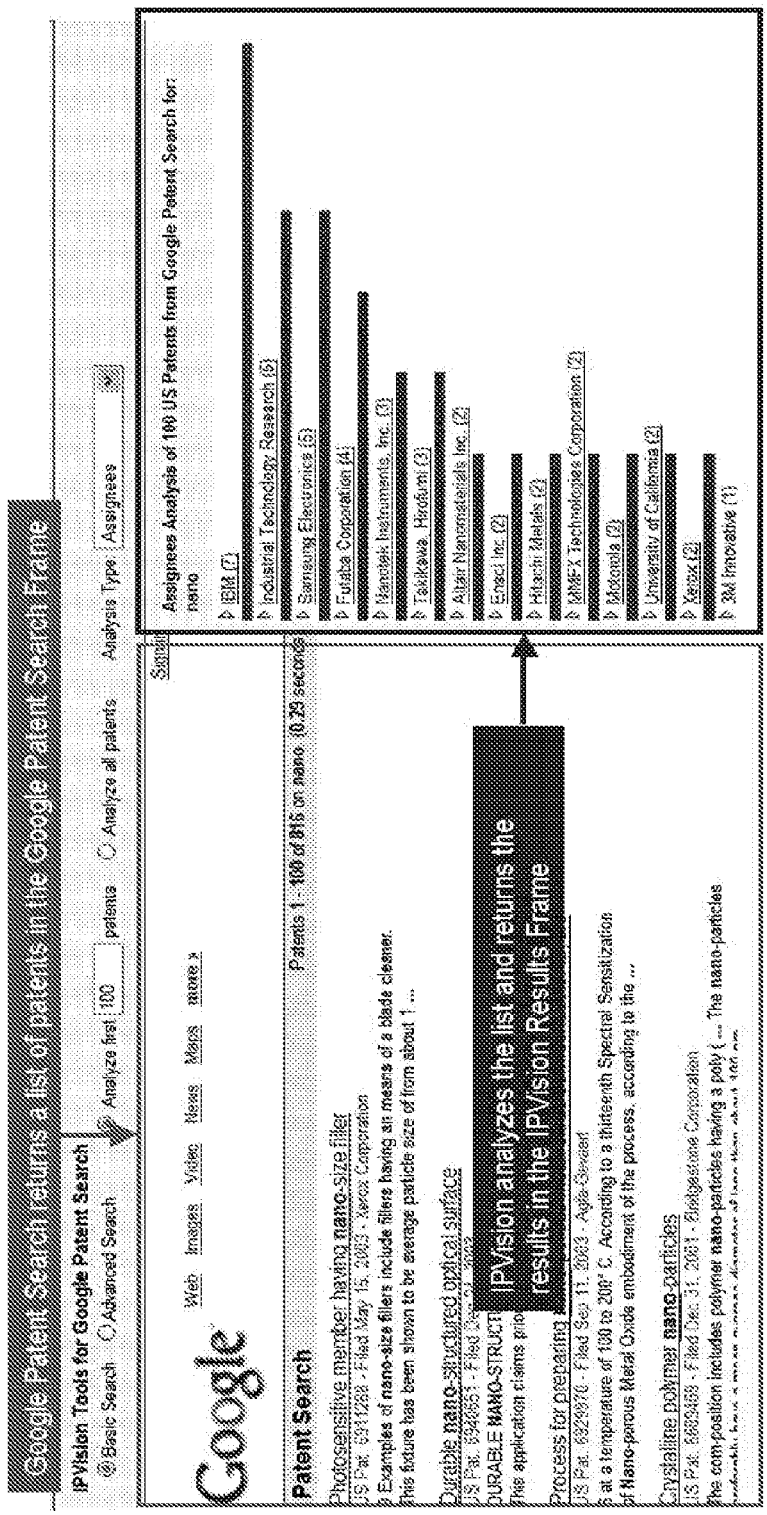
FIG. 7 shows the patent analytics web page resulting from conducting a search using the tools of FIGS. 4 though 6.

After specifying the criteria for handling data from the search results output and the type of Google search to be conducted, the user enters the search terms in the "Google Patent Search" element and clicks the "Search Patents" button. FIG. 7 shows the patent analytics web page resulting from conducting a search using the tools of FIGS. 4 though 6.

The Google Patent search engine returns a search results web page listing patents, and this page is caused to be displayed as an element in the patent analytics web page. Simultaneously, relevant data from the search results web page are fed to the patent analytics server to produce analysis results according to the specified criteria and to cause display of the analysis results in a second element of the patent analytics web page. Accordingly a first element of the patent analytics web page shows the Google Patent search engine results, and a second element, here displayed to the right of the first element, shows the analysis results. In this example the analysis is by assignee, and different assignees and their frequency of occurrence are listed in the second element.

Figure 8:
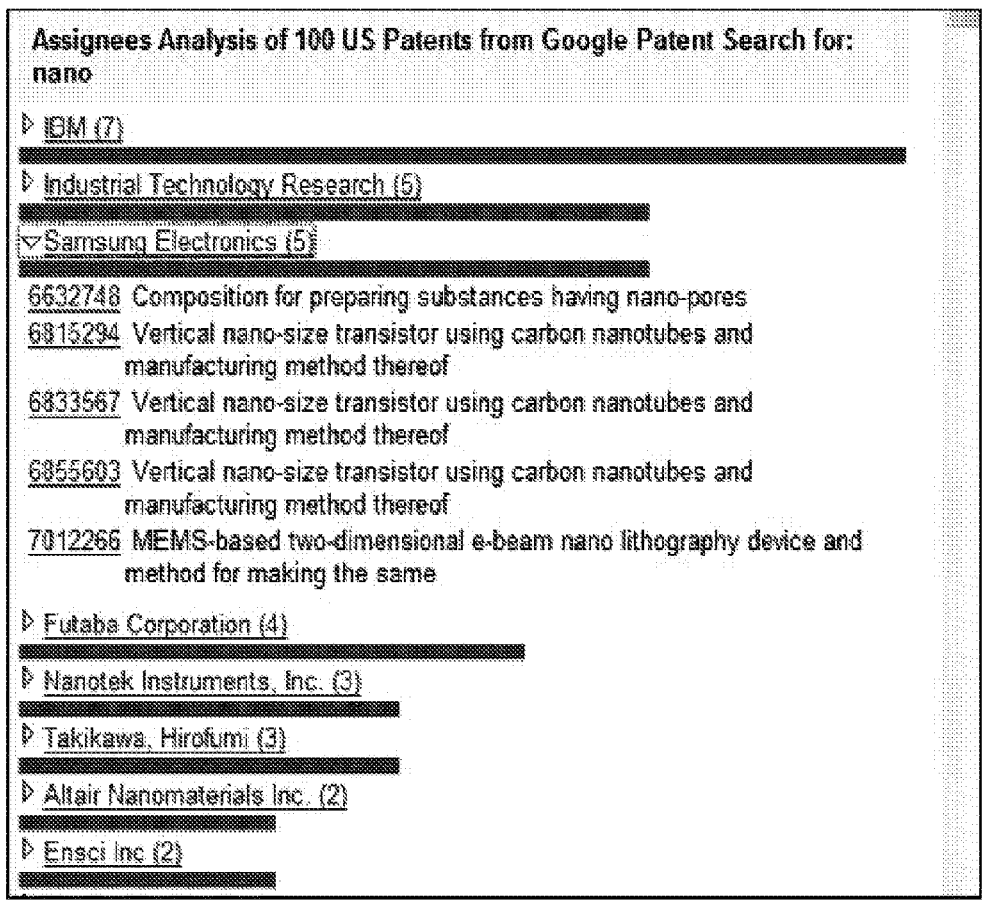
FIG. 8 shows details of the analysis results element of FIG. 7.

FIG. 8 shows details of the analysis results element of FIG. 7. (This element is the second element discussed in connection with FIG. 7.) As illustrated, the user can click the graphical button next to a category (here the relevant assignee—e.g. Samsung Electronics,) to see a list of the patents in that category, namely the listing of patents having the relevant assignee.

Figure 9:
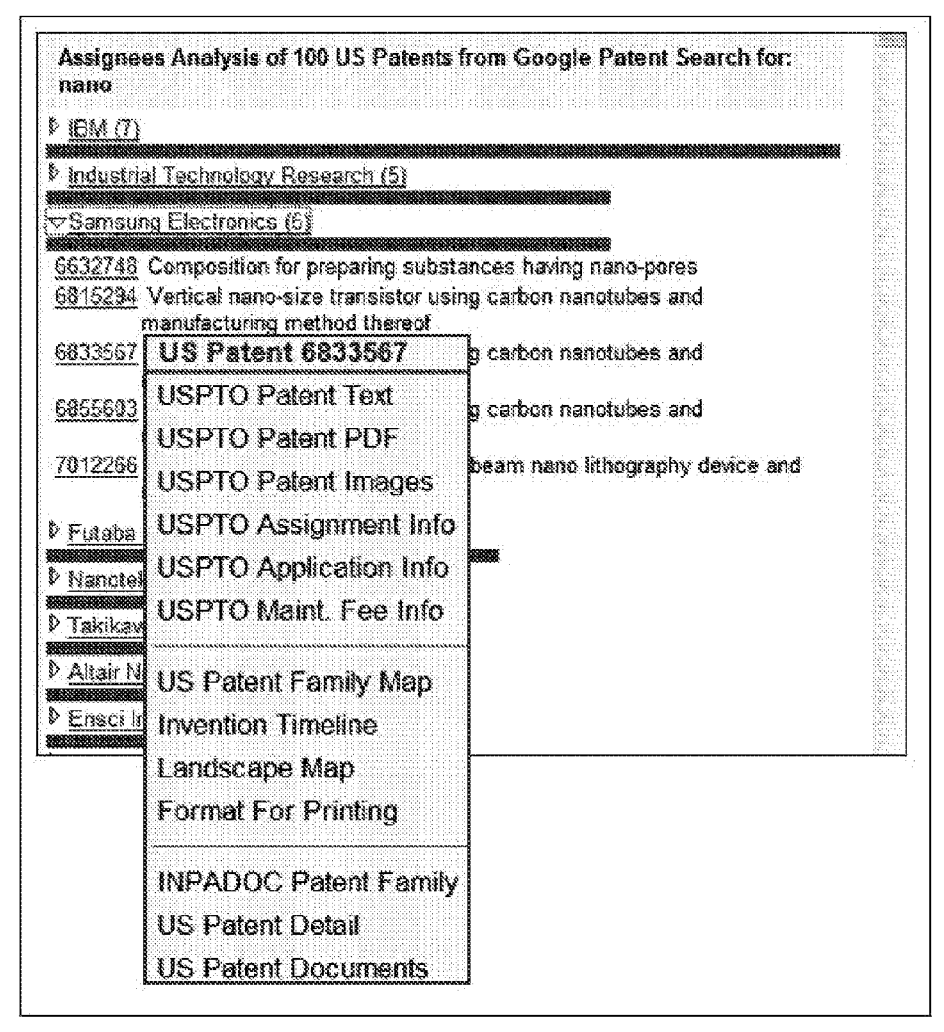

FIG. 9 shows options available for analysis with respect to a particular patent in the listing of patents for a category in FIG. 8. As can be seen in FIG. 9, using a mouse to move the cursor to a specific patent and clicking the right-hand button on the mouse (which we call "Right-Clicking" below), causes display of a series of choices for data and analyses on the selected patent: text of the patent from the USPTO database, a PDF copy of the patent assembled on the fly from the USPTO database, viewing of images of the patent from the USPTO database, assignment information for the patent from the USPTO database, application information from the USPTO database, a US patent family map, an invention timeline, a landscape map, formatting of the patent for printing purposes, INPADOC patent family data, as well as US patent detail and patent documents.

Figure 10:
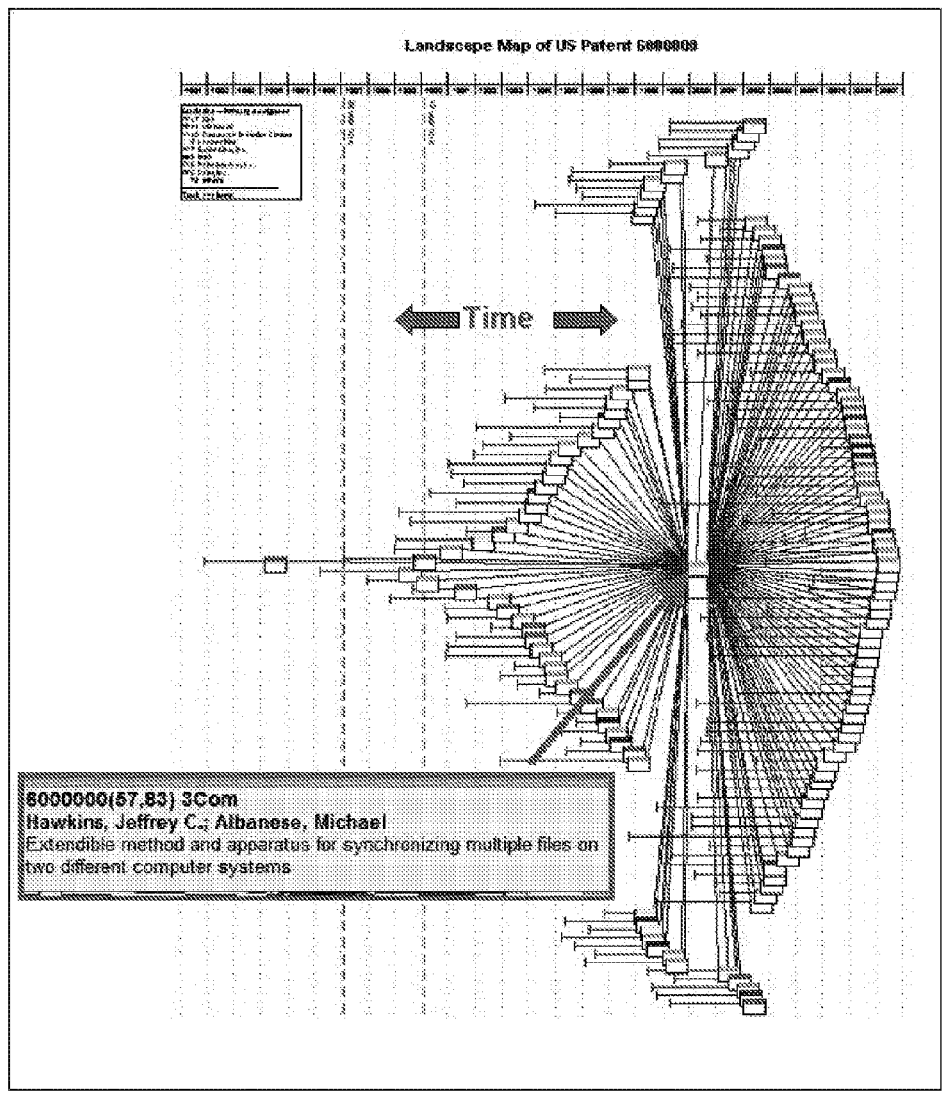
FIG. 10 shows a patent landscape map resulting from selection of the "landscape map" option available in FIG. 9.

FIG. 10 shows a patent landscape map resulting from selection of the "landscape map" option available in FIG. 9. This is an IPVision Landscape Patent Map, which shows the patent in question (yellow shaded box), the patents it cites (to the left of the yellow patent) and the patents that cite it (to the right of the yellow patent). Right-Clicking on any patent box on the map in turn provides access to IPVision data and analysis for that patent as described previously.

Figure 11:
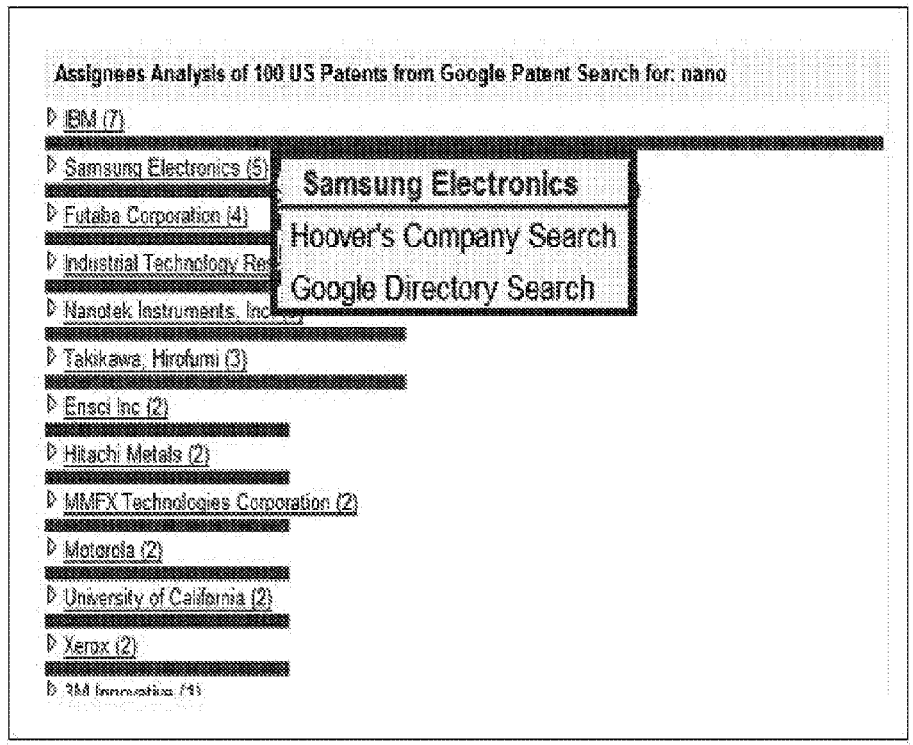
FIG. 11 shows types of data available with respect to assignees identified in the analysis results shown in FIG. 8.

As shown in FIG. 11, Right-Clicking on an Assignee name provides the user with the opportunity to launch either a Hoovers or Google Directory search for the selected Assignee.

As discussed, FIGS. 7-11 concern the "Assignee Analysis" selection item in the IPVision Toolbar. The user can specify other types of analyses to be performed on the patent list returned by Google Patent Search. We describe these types in further detail. Agent Analysis sorts the patents by the Patent Agent or Attorney who wrote the patent. Assignee Analysis sorts the patents by the Assignee listed on the Front Page of the patent when it issued. Current Assignee Analysis sorts the patents by the Current Assignee as recorded at the USPTO Assignment Database. An Examiner Analysis sorts the patents by the USPTO Examiner who reviewed the patent.

Figure 12:
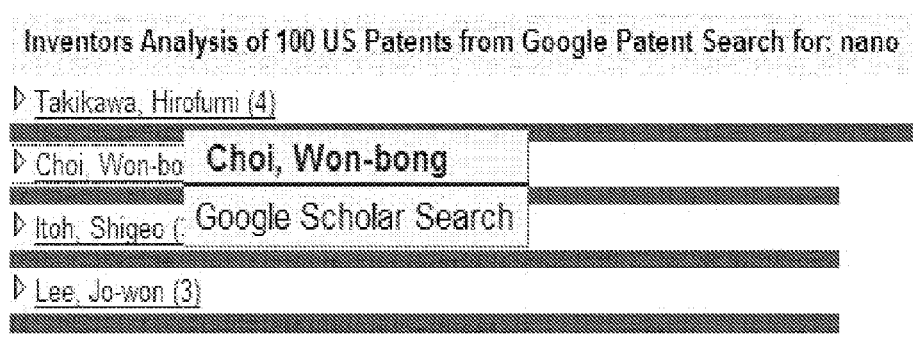
FIG. 12 shows details of the analysis results element of FIG. 7 when an inventor analysis has been specified.

An Inventor Analysis sorts the patents by the Inventors listed on the patents. In the case of joint inventors the patent will be listed under both names. FIG. 12 shows details of the analysis results element of FIG. 7 when an inventor analysis has been specified. As indicated, Right-Clicking on an Inventor Name permits invoking a Google Scholar search for that Inventor.

Figures 13, 14:
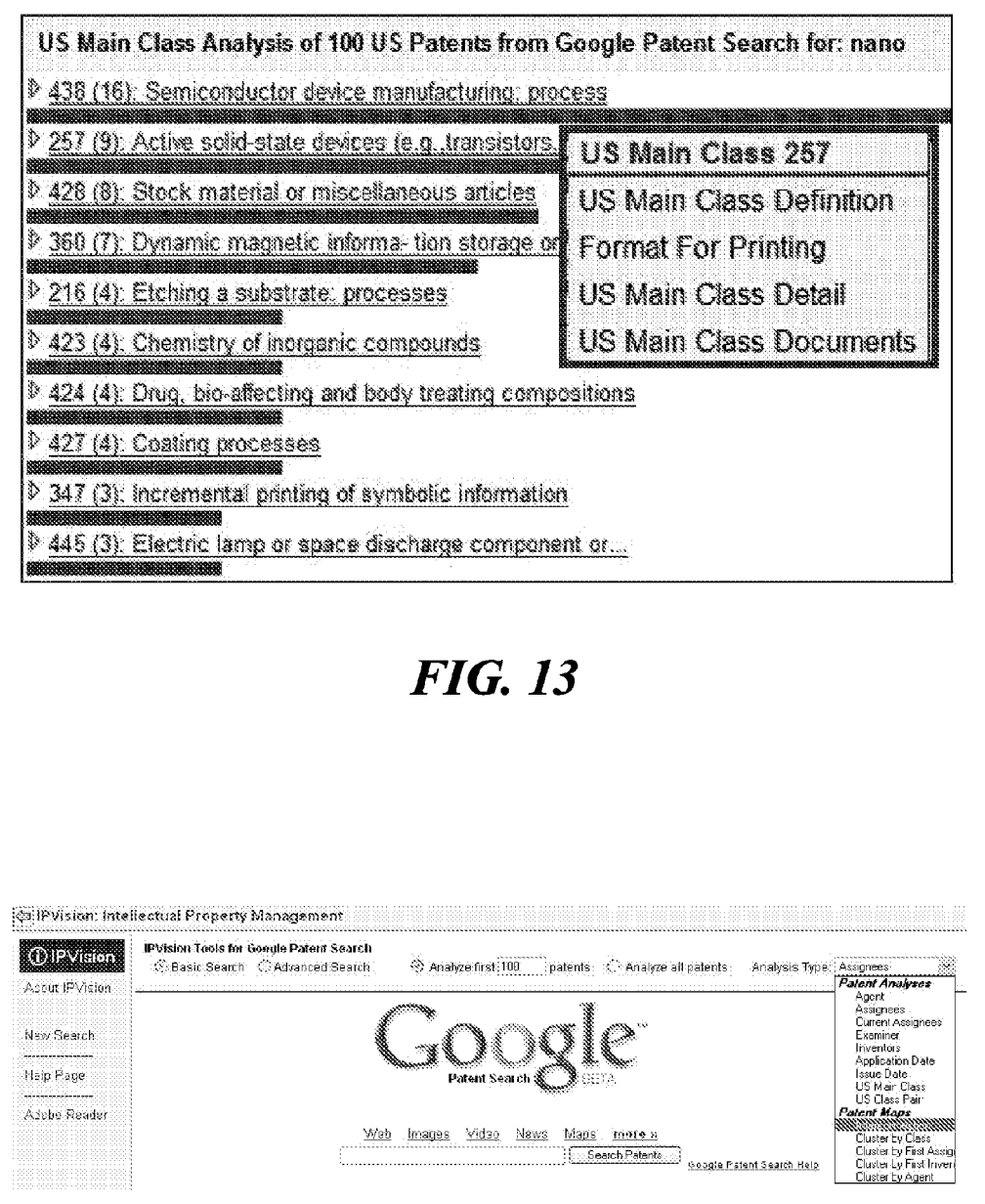

An Application Date Analysis sorts the patents by the US patent application filing date as shown on the Front Page of the issued patent. An Issue Date Analysis sorts the patents by the US patent date of grant or issue as shown on the Front Page of the issued patent. A US Main Class Analysis sorts the patents by the Primary US Main Patent Classification assigned to the patent by the US Patent and Trademark Office. FIG. 13 shows details of the analysis results element of FIG. 7 when US Main Class Analysis has been specified. As indicated, Right-Clicking on a Class displays a menu for accessing US Patent Class information.

Finally, A US Class Pair Analysis sorts the patents by the primary US Patent Classification Subclass assigned to the patent by the US Patent and Trademark Office.

In addition to the histogram types of analyses that may be specified in accordance with the tool bar illustrated in FIG. 6, in a further embodiment of the present invention, the user may specify any of a range of visual analyses of the group of patents returned by the Google Patent Search engine. FIG. 14 shows detail of a toolbar in the patent analytics web page in accordance with this embodiment wherein the user may specify, in addition to the criteria of FIG. 6, any one of a series of types of patent maps. The expanded pull-down menu of this figure shows types of maps that may be selected, and the Interconnection map is here selected.

Figure 15:
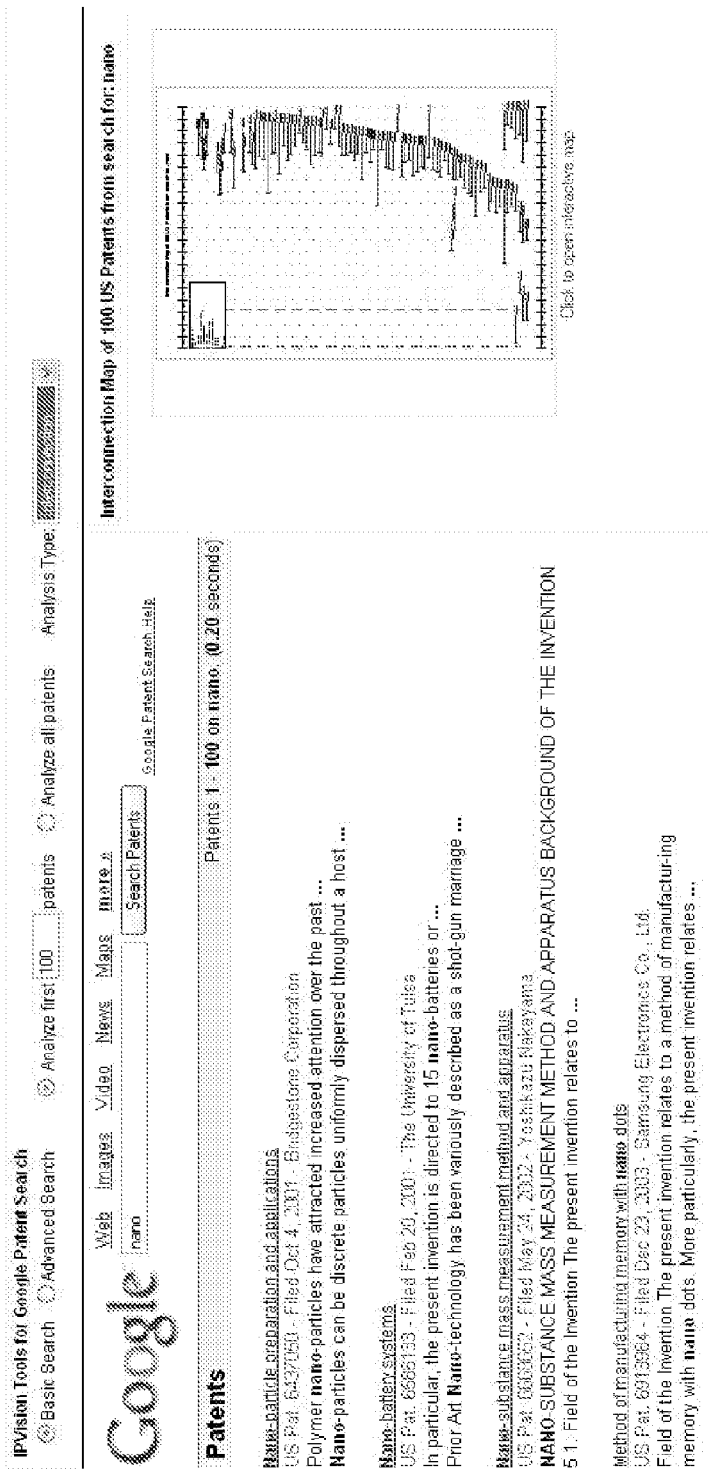
FIG. 15 shows the patent analytics web page resulting from conducting a search when the interconnection map has been specified in the manner shown in FIG. 14.

FIG. 15 shows the patent analytics web page resulting from conducting a search when the interconnection map has been specified in the manner shown in FIG. 14. An interconnection map shows the patent citation references among a group of patents, in the case of FIG. 14, the patents returned from a Google patent search using the keyword "nano". As in the case of FIG. 7, the second element, shown on the right, displays the analysis results, here as a map. In connection with FIG. 10, we described a patent landscape map on a single patent selected by the user. In this figure, we have the ability to create a map or other visual analysis on an entire list or, by extension, a desired sublist.

Figure 16:
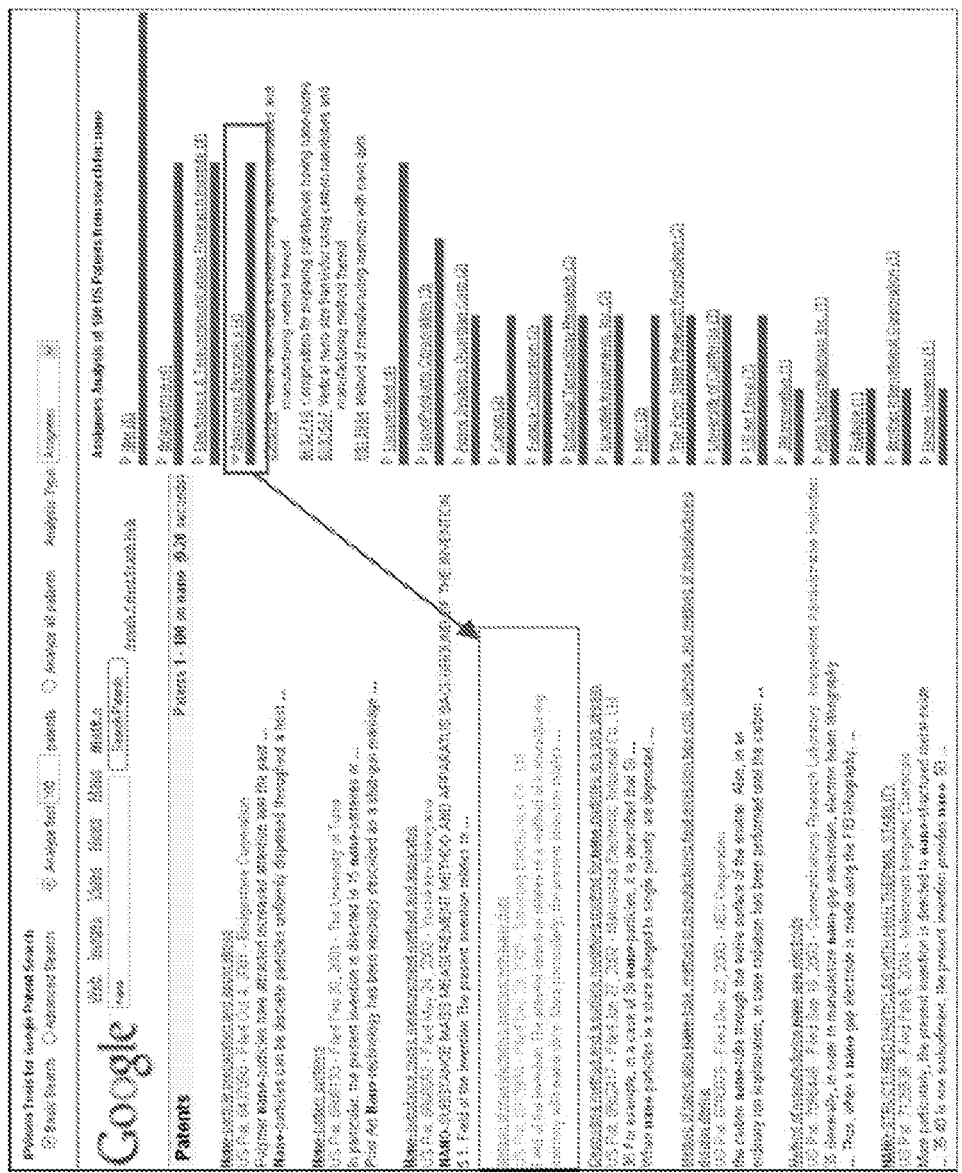
FIG. 16 provides an example of highlighting of items in Google Patent search engine results corresponding to a selected item of analysis results, where the analysis results are specified as assignee histogram data.

In a further embodiment of the present invention, in the patent analytics web page, the user may trigger highlighting of one or more individual items in the first element (on the left, showing Google Patent search engine results) that correspond to a selected item of analysis shown in the second element (on the right, showing analysis results). This highlighting can be accessed from any analysis results type, including visual analyses and histogram analysis presentations. FIG. 16 provides an example of highlighting of items in Google Patent search engine results corresponding to a selected item of analysis results, where the analysis results are specified as assignee histogram data. Here the user has clicked on the assignee name "Samsung Electronics" in the second element, on the right, and the patents owned by Samsung are shown highlighted in the first element, showing Google Patent search engine results.

Figure 17:
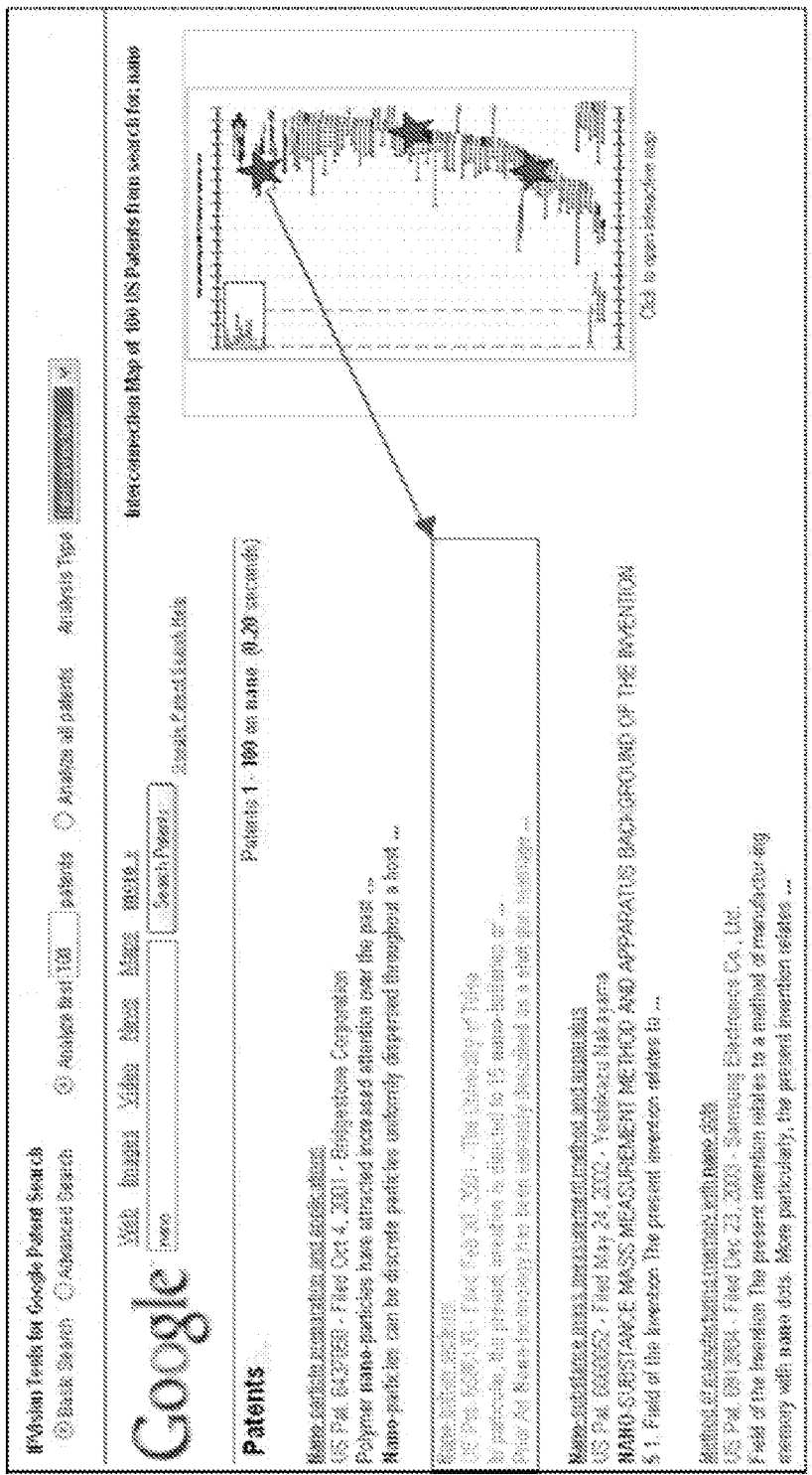
FIG. 17 shows similar highlighting in connection with a "seminal patent analysis"

FIG. 17 shows similar highlighting in connection with a "seminal patent analysis". In the example of FIG. 17, a seminal patent analysis has been run on the interconnection map shown originally in FIG. 15. A seminal patent analysis identifies patents that have been highly cited, which in the case of FIG. 17 are represented by red stars on the IPVision Interconnection Map shown in the analysis results element. The corresponding items in the Google Patent search engine results element are also highlighted (in yellow). The approach of selecting one or more items in the analysis results element is of course extendible beyond highlighting in the domain of Google Patent Search engine results of the preceding examples. Various means of highlighting are anticipated including different overlay colors, changing font attributes (e.g. bolding, italizing or underlining), different display approaches such as blinking or flashing and other means of drawing the user's attention to the items selected in the analysis results element.

Societal analyses. Although we have described a wide range of specified analyses that may be carried out by the processes described above, there is yet another class of analyses that may be carried out by such processes. In particular, this further class of analyses relates to a societal dimension of patents, addressing political and geographic attributes of assignees and inventors of patents. Such analyses may provide, with respect to search results from the search engine, in one embodiment, a listing of the numbers of patents by city or town and state or country of the assignee or of inventors. Such a listing may be displayed even visually on a map of the United States (in the case where all assignees are from the United States) or of the world or other pertinent geographic area, depending on the political data for the assignees and inventors. We describe this approach immediately below.

Figure 18:
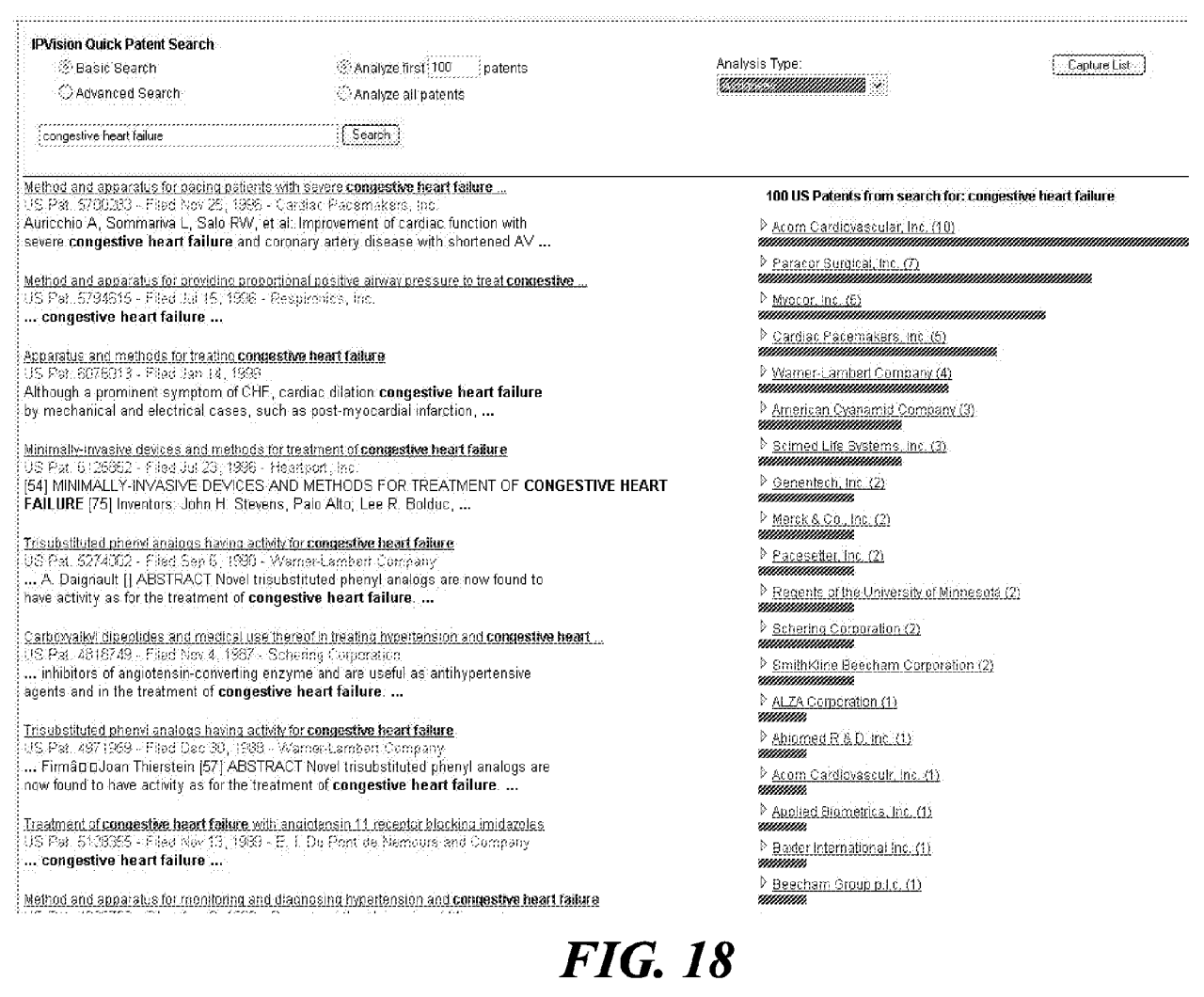

For purposes of illustration of societal analyses, we begin with FIG. 18, which shows a patent analysis web page in accordance with an embodiment of the present invention, in which, like the embodiment of FIGS. 6-11, an "assignee" analysis has been specified, displaying here search results for the string "congestive heart failure" and an assignee histogram.

Figure 19:
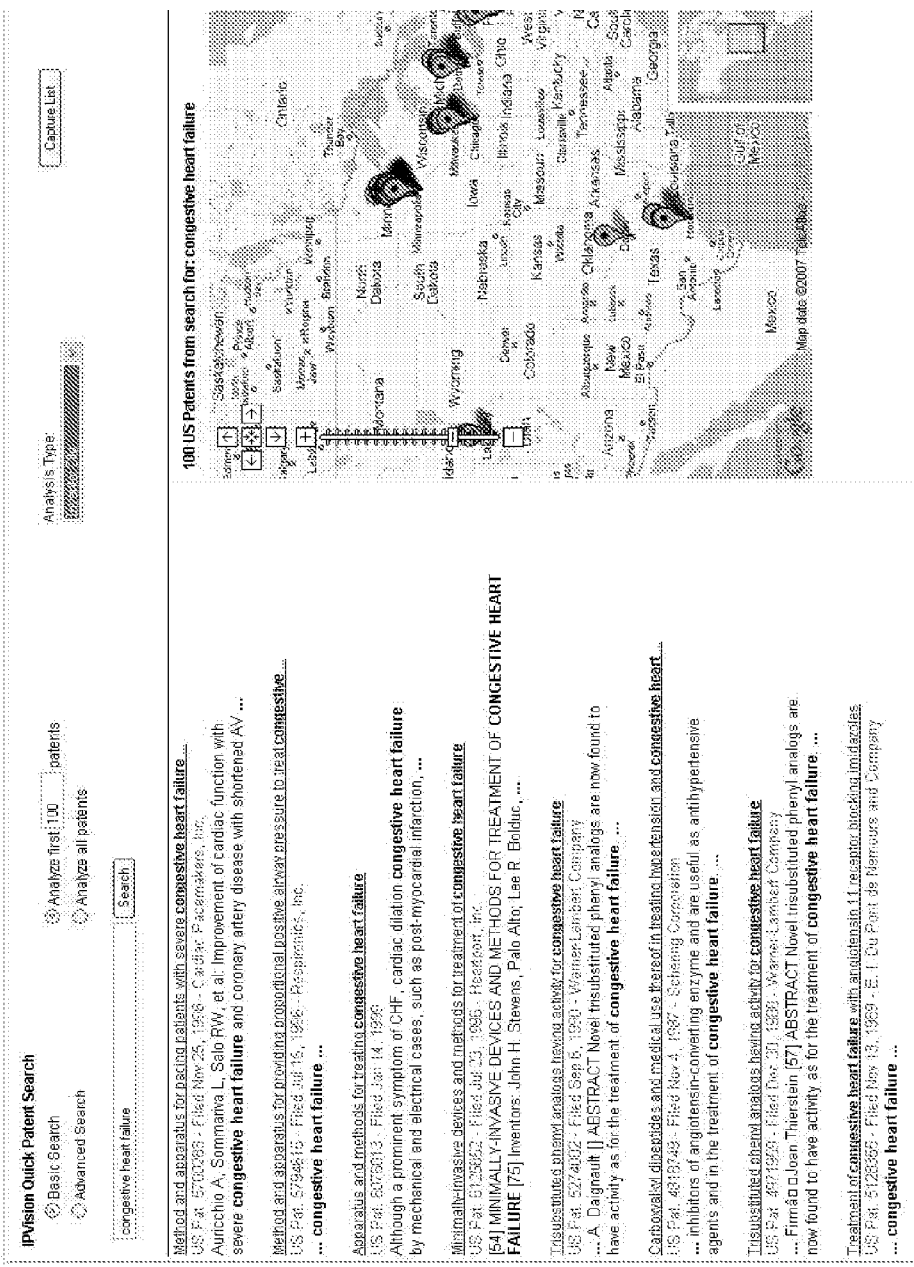
FIG. 19 shows a patent analysis web page in accordance with an embodiment of the present invention, in which the search results for the string "congestive heart failure" have been subject to a specified analysis using the Social Network Maps function "Inventor City"

FIG. 19 shows a patent analysis web page in accordance with an embodiment of the present invention, in which the search results for the string "congestive heart failure" have been subject to a specified analysis using the Social Network Maps function. In this example, the particular analysis type chosen under Social Network Maps is "Inventor City". In this example, the analysis web page displays the expected element in the left in which the search engine results are presented and an additional element, disposed in the right, showing a map of the US, with pointers to geographic locations of all the inventors of patents identified in the search results. In this embodiment, each inventor's location (i.e., town and state) is derived from the face of the patent; this information in turn is used to access a zipcode data base, which provides zipcode data to feed to a web-based mapping engine such as Google Maps. In a further related embodiment, the inventor name and location (and optionally, assignee data) derived from the face of the patent are used to access one or more databases, such as Zoominfo and whitepages.com, to provide either additional or updated address information for the inventor, before sending data to the mapping engine. The map displayed necessarily depends on the locations of the inventors; if inventors are all over the world, the map displayed may be a map of the world; if the inventors in Europe, the map displayed may be a map of Europe, and so on, depending on the location of the inventors. In the present example, one may observe a cluster of inventors around Minneapolis.

Figure 20:
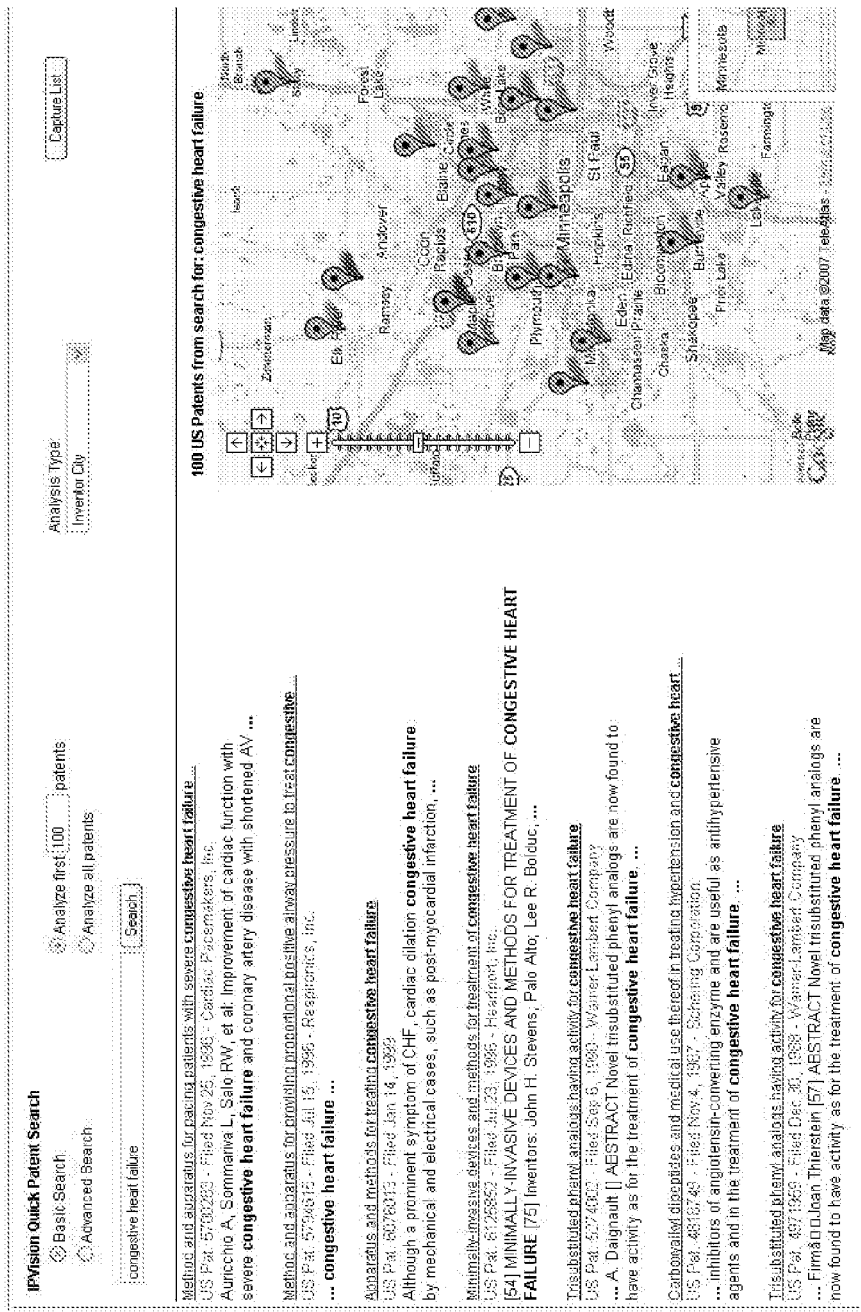
FIG. 20 shows a patent analysis web page in accordance with the embodiment of FIG. 19 with the same search string and specified analysis as in FIG. 19, wherein is illustrated the effect of invoking the zoom function of the map.

FIG. 20 shows a patent analysis web page in accordance with the embodiment of FIG. 19 with the same search string and specified analysis as in FIG. 19, wherein there is illustrated the effect of invoking the zoom function of the map. Here we have used the zoom function to show the Minneapolis/St Paul area, and one can observe the large number of inventors for "congestive heart failure" in this area. In addition to selection based solely on geography of inventors pertinent to this search, selection can be refined based on number of patents issued to each inventor, age of inventor's patents, or a manual review of the patents pertinent to inventors in a given area, and so on. The information provided by this analysis enables one to form a discussion group or blog or IM (instant messaging) circle involving these inventors.

It is within the scope various embodiments of the present invention to provide advertising based on the analysis results presented or based on at least one item included in at least one of the analysis and the search results content. For example, if an analysis is performed for which analysis results are hybrid engines, then an advertisement engine can deliver advertisements for hybrid engine patents available for license or sale. If a geographic distribution of inventors is displayed for a search directed to hybrid engines in which a major cluster of inventors appears around Detroit, then an advertisement engine can deliver advertisements for automobiles from General Motors or Ford Motor Company. If an analysis is performed in which Intel happens to be the largest assignee, then an advertisement engine can deliver advertisements for Intel products or for the benefits of having "Intel inside".

Figure 21:
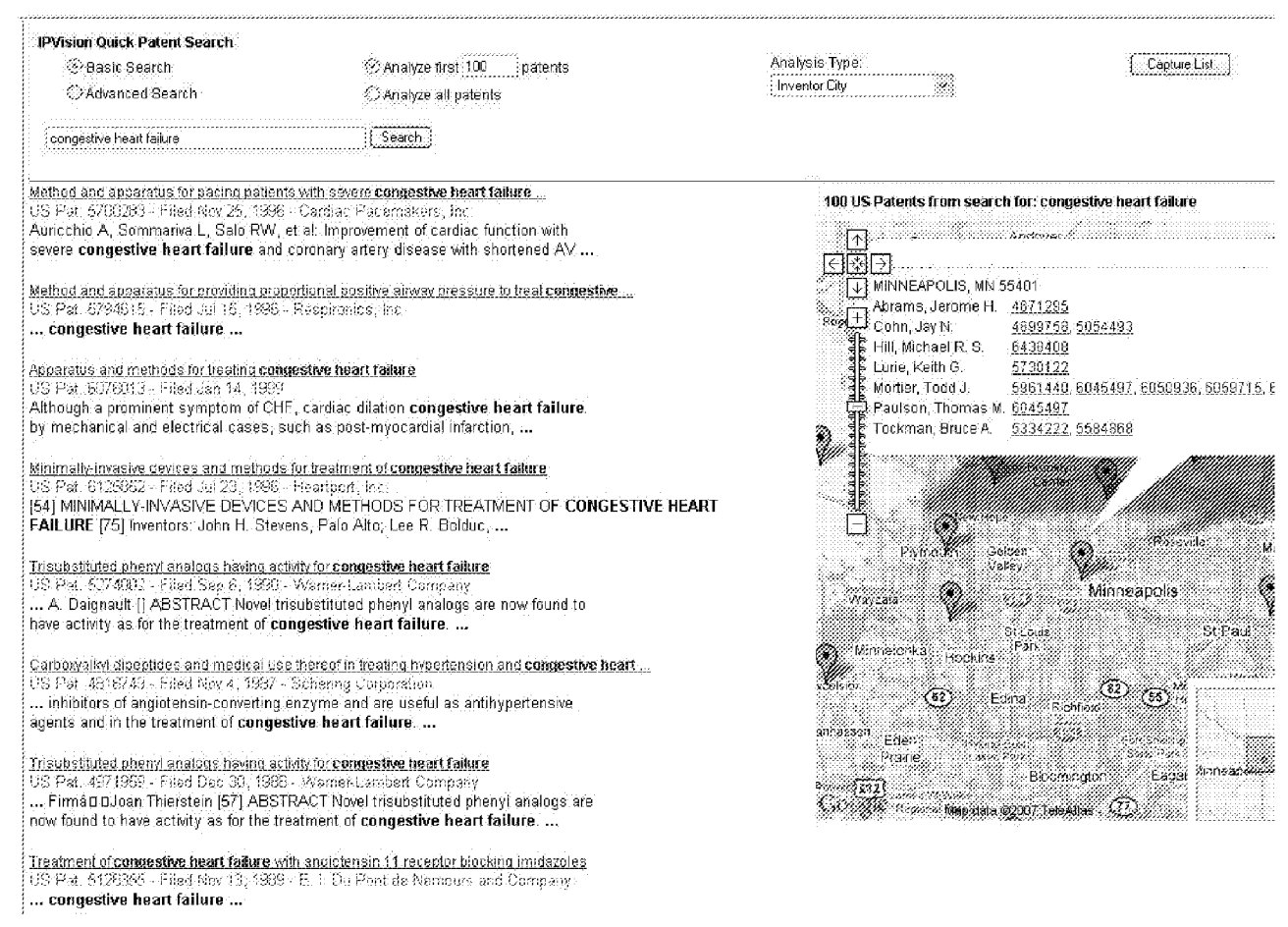

FIG. 21 illustrates the effect of graphically selecting a specific pointer shown in the map of FIG. 20. By graphically selecting a specific pointer, one can review information pertaining to particular inventors having one or more patents identified by the search engine in the location of the pointer. As can be seen in FIG. 21, this information includes a listing of patent(s) for each inventor at the location. Selecting graphically a hyperlink associated with a given patent provides further information including, but not limited to: assignee, date of application of the patent, date of issue of the patent, abstract of the patent, claims, and references cited, and citing references. In further related embodiments, there may be displayed other additional analyses (such as a patent landscape map or a patent co-citation map) or other additional information (such as INPADOC patent family information or links to web-based databases such as INPADOC or the United States Patent and Trademark Office for data corresponding to the patent) or other more general information about the inventor and the patent (such as the inventor's publications, history of employment, and other information in public or private databases accessible from the web or otherwise available).

The inventor or assignee mapping appearing on a patent analysis web page graphical in embodiments of the present invention may also be enhanced to show more information. For example, attributes of pushpins (or other locator icons) on the map—such as color, size, faded appearance, or shape—may be used to show attributes of patents pertaining to the inventors, or assignees, or of the patents pertaining to them. Indeed, the use of pushpin icons is arbitrary, and the selection of locator icon can also be varied to indicate an attribute. Hence any locator icon characteristic, including locator icon selection, color, size, appearance, and shape may indicate an attribute. Where inventors are being mapped, for example, all inventors having a common assignee may be represented by a specific shape or color. Inventors having no indicated assignees may be represented by a unique shape. All inventors or assignees having only expired patents may be represented by a pushpin having a faded appearance. An inventors or assignee holding a plurality of patents may be indicated by a pushpin having a size that is a function of the number of patents held by the inventor or assignee. Alternatively, the size of a pushpin may be made a function of the imputed importance of patents held by the respective inventor or assignee. In this case, the imputed importance of a patent may be based, for example, on the downstream citation frequency experienced by the patent or by the strength of its claims as determined by metrics known in the art. In addition, we may utilize any of the foregoing criteria not just for representation of pushpins but also to select pushpins for representation in the first place.

Multi-jurisdictional analyses. FIGS. 22-27 illustrate the use of an embodiment, similar to the embodiment of FIGS.

6-11, employing a specified assignee analysis, but here using one or more patent search engines to permit analysis of patent properties from multiple jurisdictions for the purpose of obtaining multi-jurisdictional information. We show in particular how such an embodiment may be used to obtain analyses of the results of searches over three different web search engines (US, Chinese, European) for patents that match the keyword "RFID" (radio frequency identification), and how these analyses in turn can be integrated into a multi-jurisdictional understanding.

Figure 22:
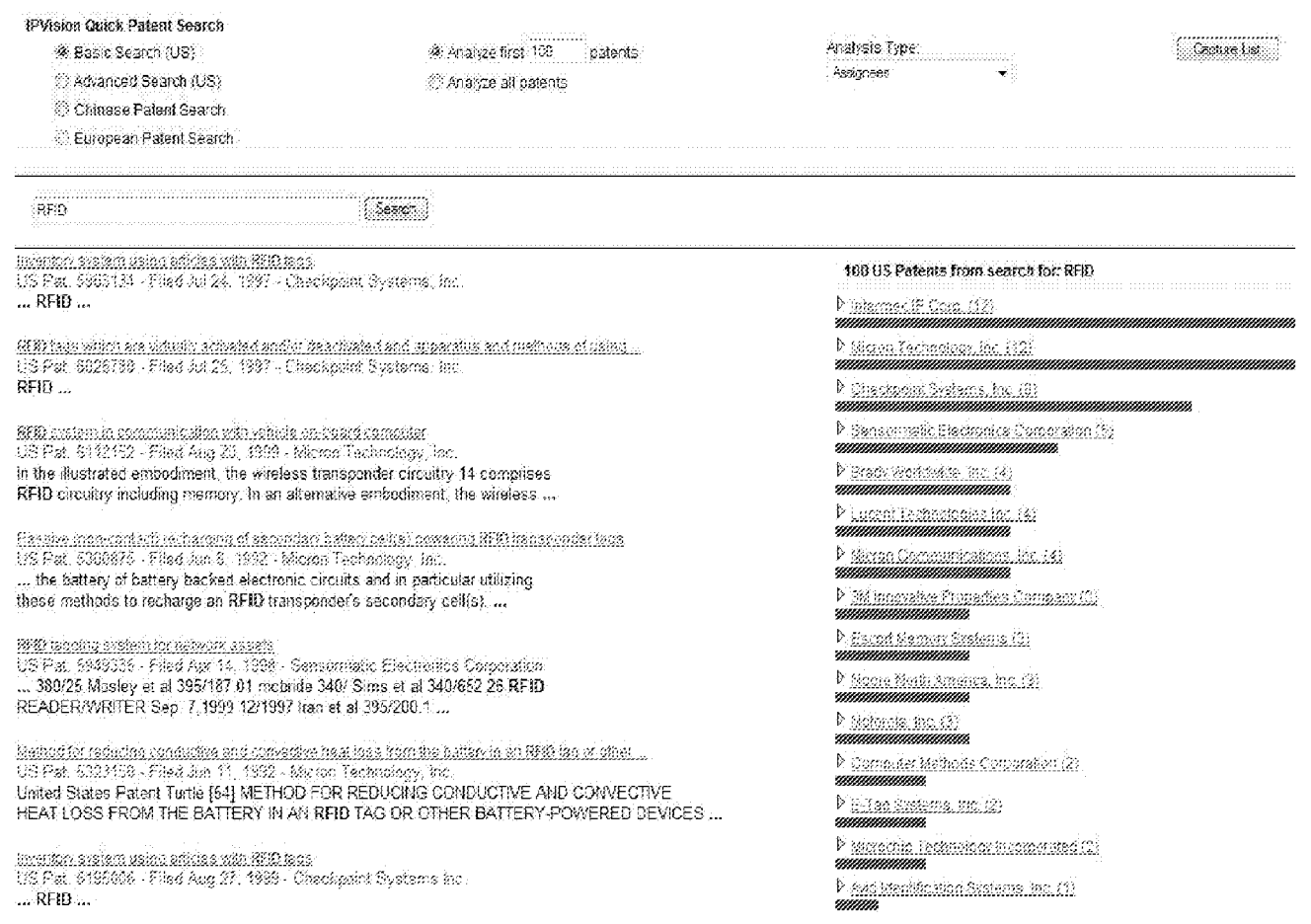

In FIG. 22, such an embodiment is utilized to specify as "Analysis type" a histogram showing patent assignees for a search of US patents for the term "RFID". The analysis histogram shows that Intermec IP, Micron, Checkpoint, and Sensormatic are the top four Assignees of patents in this search of the US patent database. Note that the assignees returned from this search are primarily US based companies.

Figure 23:
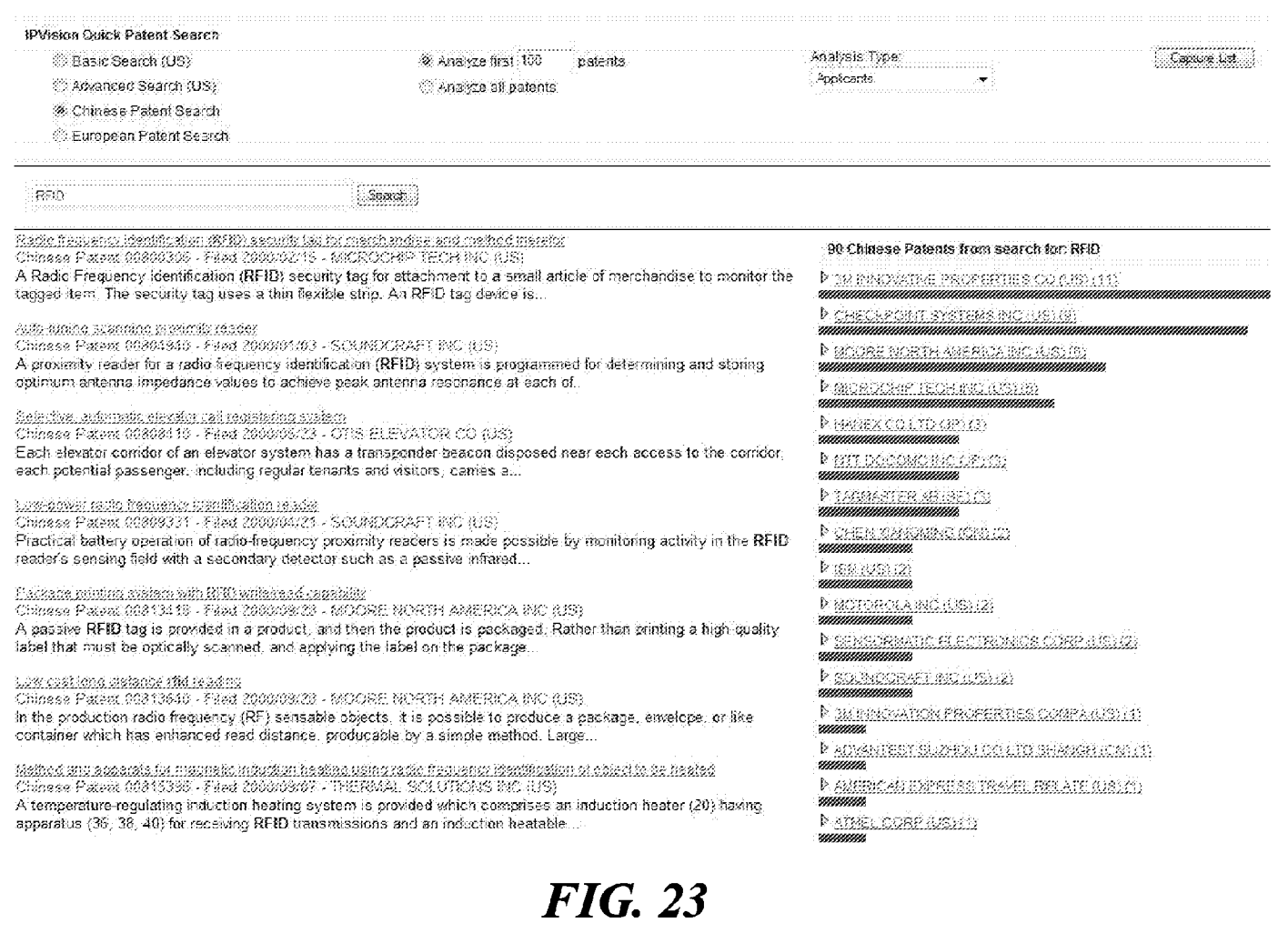

In FIG. 23, the embodiment is utilized to specify as "Analysis type" a histogram showing patent applicants for a search of Chinese patents for the term "RFID". In other words, there are two differences between the parameters specified in this figure and the parameters specified in FIG. 24: here the jurisdiction specified is the Chinese patent office, not the US Patent and Trademark Office; and here the specified "Analysis type" is for "Applicants", not assignees. As a practical matter, in most countries other than the United States, applications for a patent may be filed directly and initially by a company employing the inventor and need not be in the name of the inventor. Because US law specifies generally that patent applications can be filed on behalf of a company employing an inventor only if the inventor has explicitly assigned the patent rights to the company, a search of the US Patent and Trademark Office to identify companies that have filed applications requires searching for "assignees" having a particular name. On the other hand, for jurisdictions outside the United States, a search to identify companies that have filed applications requires searching for "applicants". Thus, although the two terms are different, they produce similar kinds of data. This histograms resulting from this search in the Chinese Patent database by a different search engine shows that 3M, Checkpoint, Moore, and Microchip are the top 4 Applicants in China. Note in the histogram based on the search results that many companies other than native Chinese companies have filed for patents in China.

Figure 24:
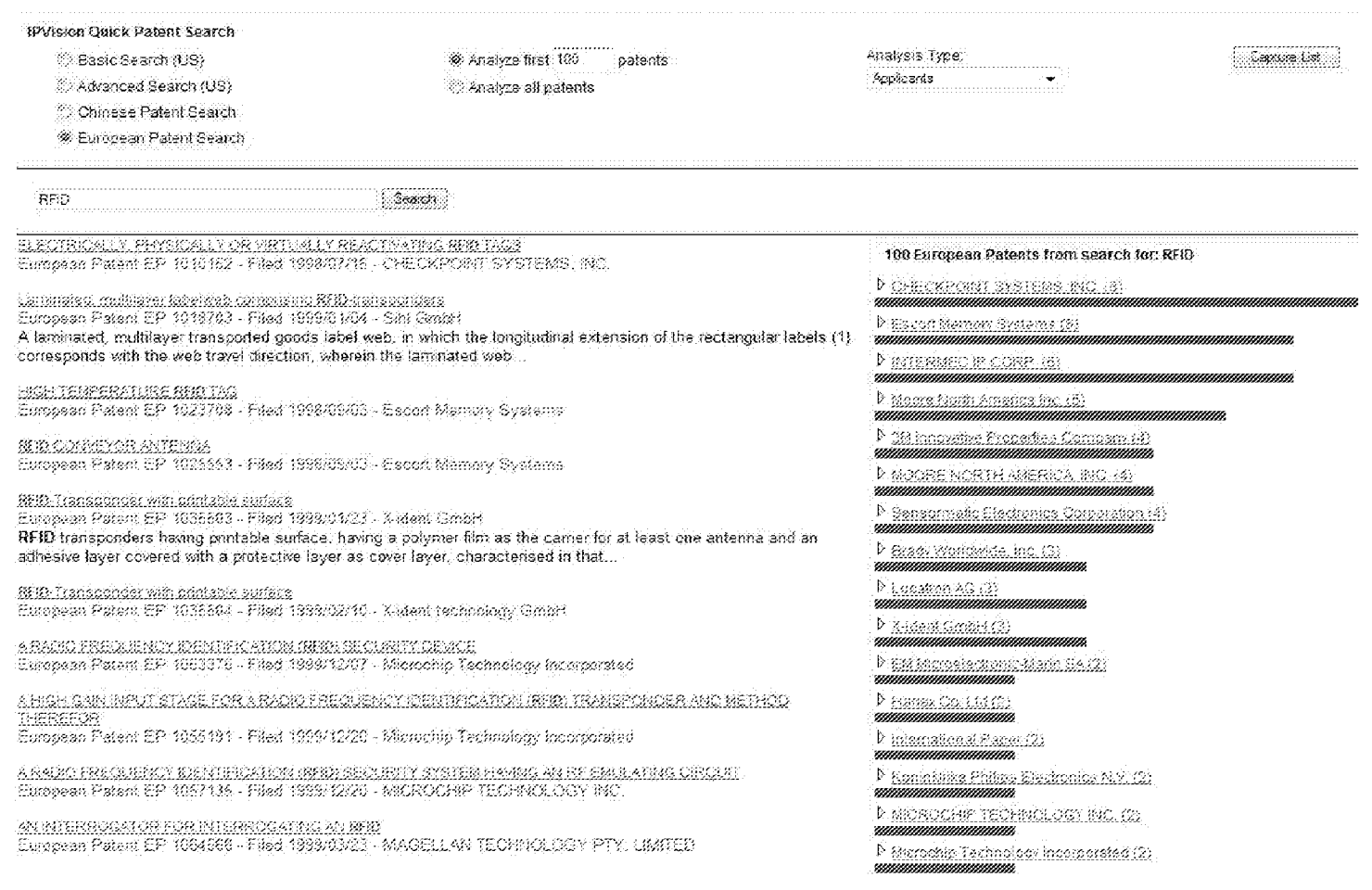

In FIG. 24, in a fashion analogous to the approach illustrated in FIG. 23, the embodiment is similarly utilized to specify as "Analysis type" a histogram showing patent applicants for a search of European patents for the term "RFID". Here the analysis histogram returns Checkpoint, Escort Memory, Intermec, and Moore as the top Applicants/in a European Database of patents. Note that these are the some of the same companies as showing up in the US and China searches of FIGS. 22 and 23.

Figure 25:
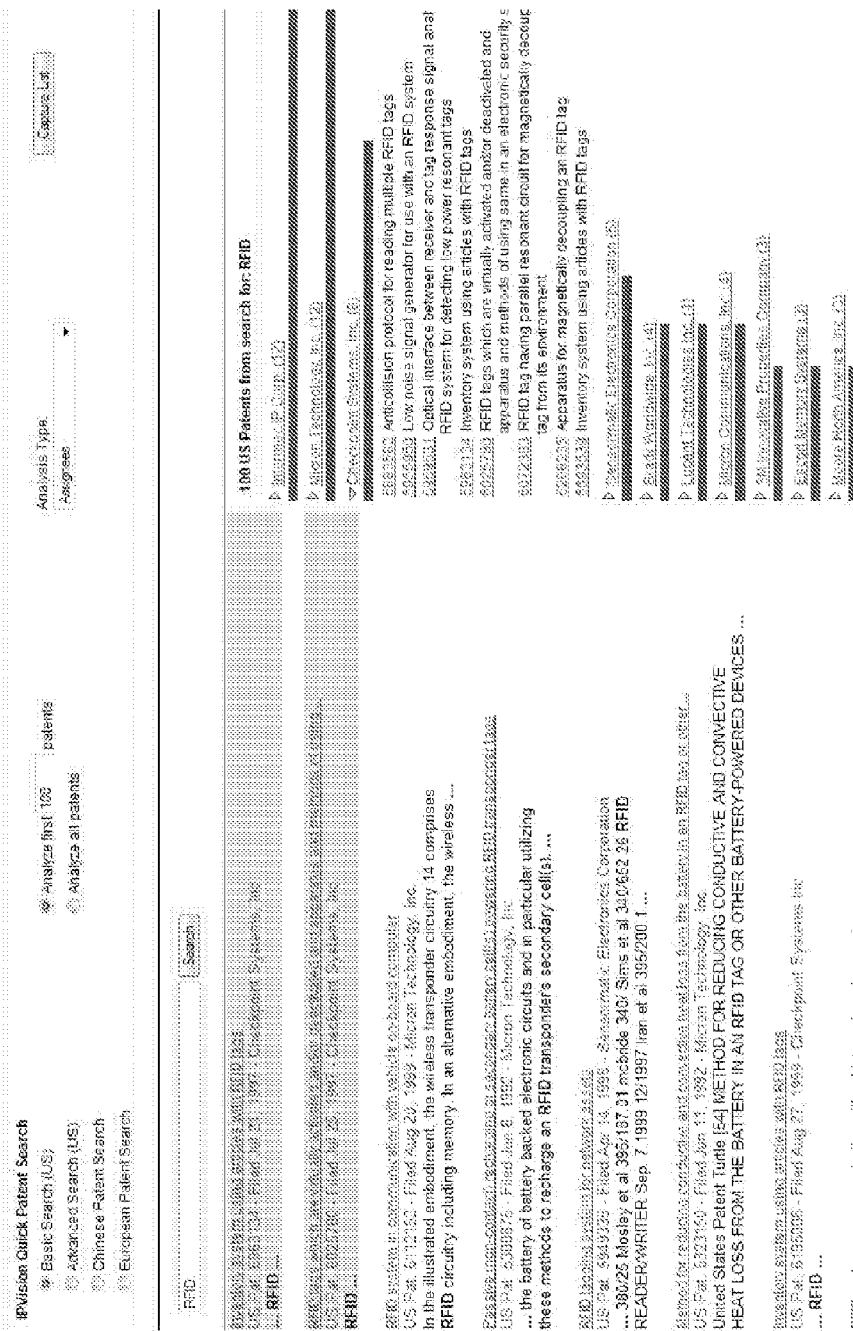
Figure 26:
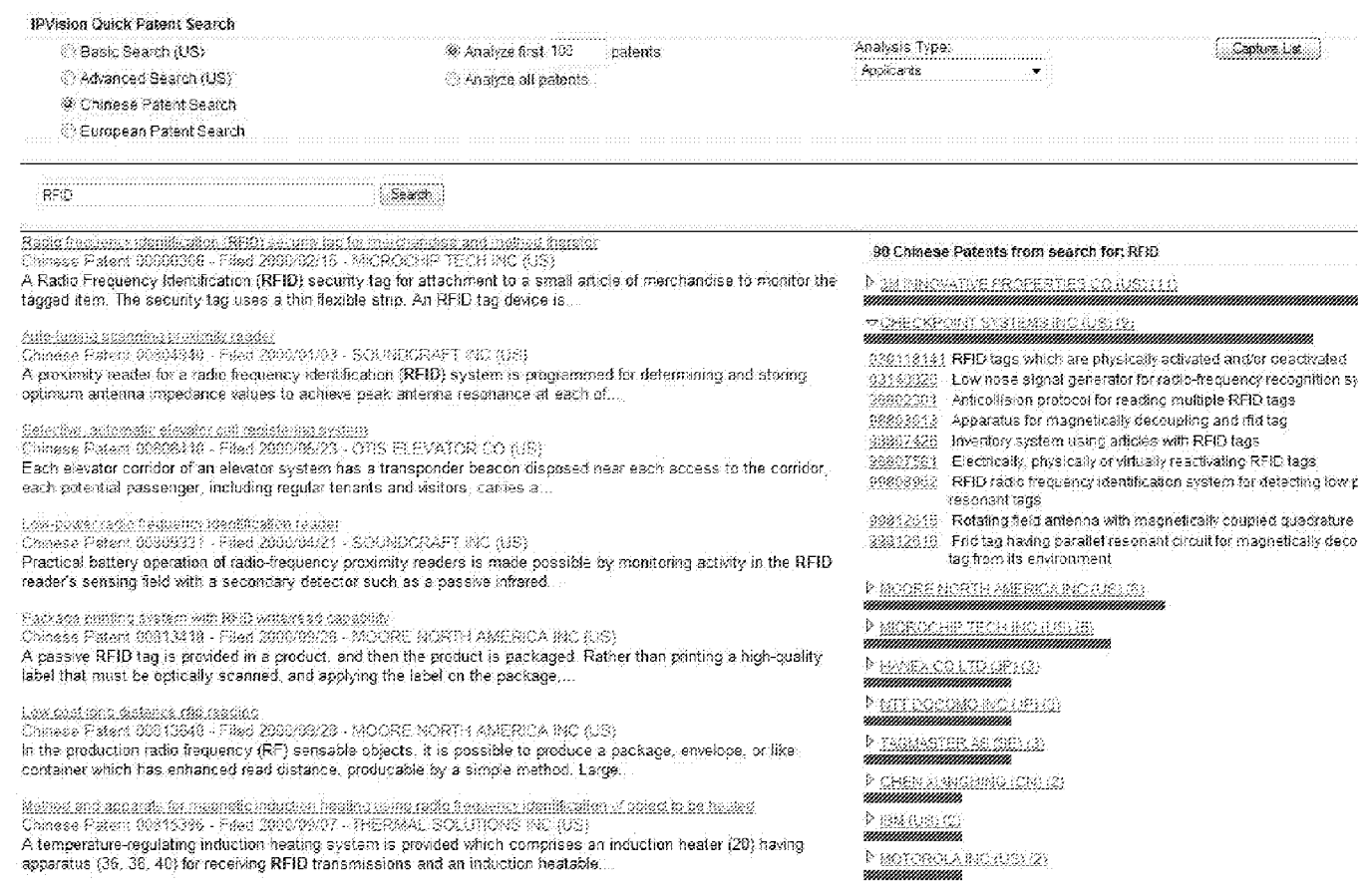
Figure 27:
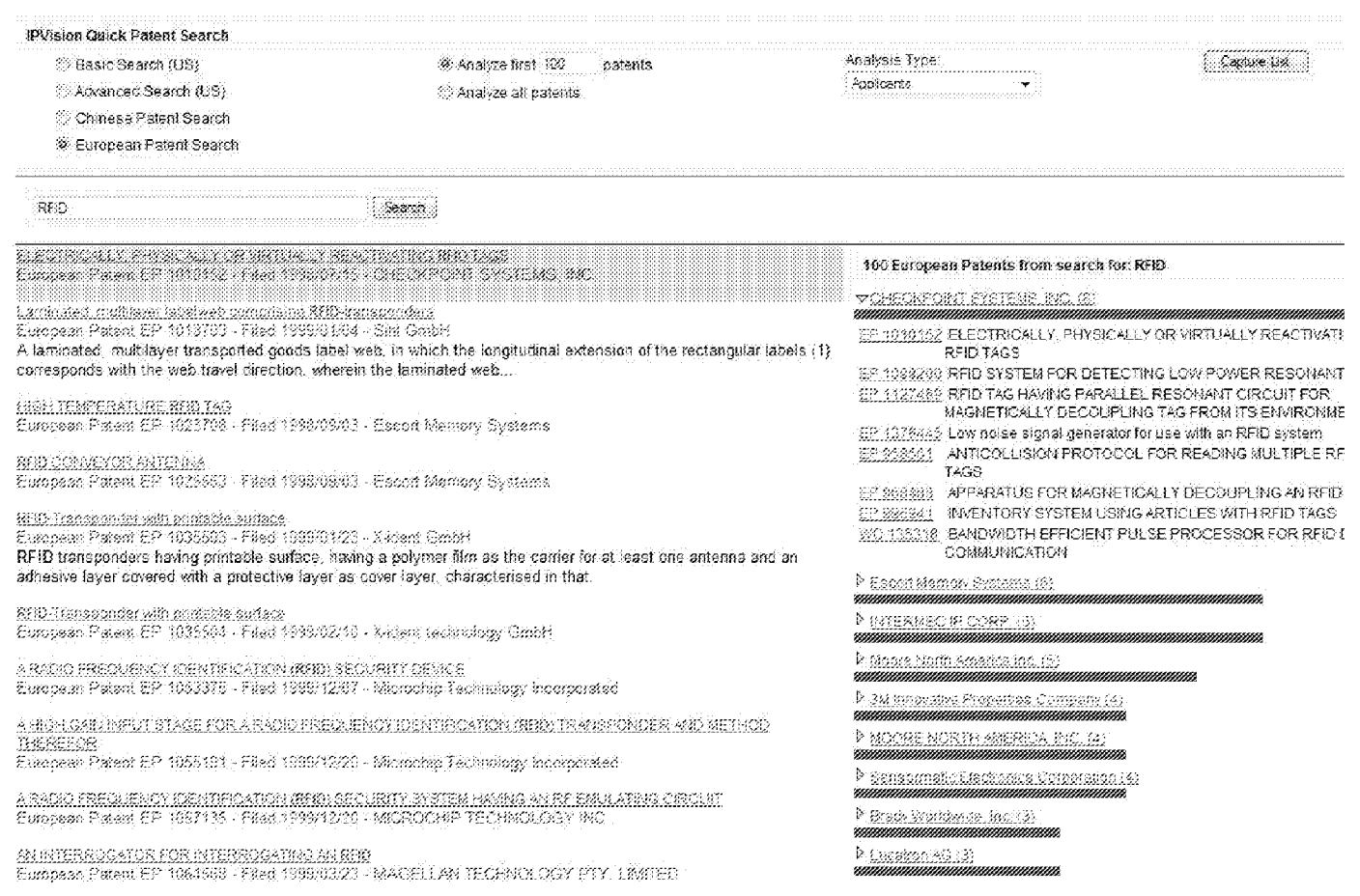

With these analysis results FIGS. 22-24, it is possible to perform further analysis on the analysis results, such as comparative numerical analyses with histograms and Patent Maps of relationships among the several search results. In FIG. 25, we show an expansion of the histogram analysis in FIG. 22 to identify particular US patents assigned to Checkpoint. In FIG. 26, we show an expansion of the histogram analysis of FIG. 23 to identify particular Chinese patents issued to Checkpoint, the same company as in FIG. 25. In FIG. 27, we show an expansion of the histogram analysis of FIG. 24 to identify particular European patents issued to Checkpoint. With these cumulative analytic results in hand, further analyses may be carried out on these results—such as determining the extent to which the patents filed by Checkpoint in the US, China, and Europe are equivalent. In this respect, processes (such as patent family searches) can be employed to identify equivalents among these patents from these several analyses. A comparison of the respective patents filed in the US, China, and Europe may provide information as to the importance Checkpoint places on its technologies in different parts of the world. (Patents take significant resources to file and maintain and thus it is an economic decision where and when to file to protect specific technologies.) Such further analyses may provide some insights as to a company's global business strategy.

Multi-level searching. Alternatively, or in addition, there may be employed a multi-level search. Consider, for example, an analysis of search results that provides a histogram representation of inventors identified in the search results, as described above with respect to FIG. 12. For each inventor listed, a second search, using the Google scholar search engine, for example, may be performed automatically as part of the analysis to provide links to papers by each inventor. In this embodiment, results of the patent search engine are captured in processes running in connection with the user's browser, and data, including inventor names, are extracted and used as search criteria for the second search engine. The processes running in connection with the user's browser make the results from the second search engine available for display when such results are selected or specified by the user. Similarly, if the user selects only specific patents from results of the patent search engine, the secondary search results may be correspondingly filtered to show only papers by inventors pertinent to the patents so specified. Alternatively, or in addition, the multi-level search can seek to identify institutions of higher education with which each inventor is associated, using search engines such as Google Scholar and Zoominfo. For each institution, further recourse to search engines may identify other publications and patents involving inventors and researchers in the same field or research group at the institution. Moreover, search engines such as Zoominfo may be used to generate a profile report of such inventors and researchers, for use as a recruiting tool—for hiring team members, finding expert witnesses, hiring consultants, for tracking key inventors, etc.

Multi-level analyses. In another embodiment of the present invention, multiple levels of analysis may be presented simultaneously. Thus, for example, an inventor histogram analysis (such as in FIG. 12) may be presented as an element of an analysis web page (in a middle section of the web page, for example), and an inventor map (such as in the right side of FIG. 19, for example) may be presented simultaneously as another element of the analysis web page (in the right side of the web page, for example). Optionally, the search results content may be displayed as well (in the left side of the web page, for example).

Capture list; capture selected. In various embodiments of the present invention, there is be provided the ability to capture (namely store) a list of the search results content and, optionally, the analysis results. In addition, there is optionally provided the ability to capture items of search results content that that have been selected (typically graphically) by the user; similarly, there is optionally provided the ability to capture items of analysis results that have been selected. In this fashion the saved items can be recalled and redisplayed as well as subjected to further analysis and further selection. These "Capture List" and "Capture Selected" features are shown as graphical buttons in the upper right corner of the screen in FIG. 32.

Analyses of content other than patents. Embodiments of the present invention are not limited to the analysis of patents.

Figure 32:
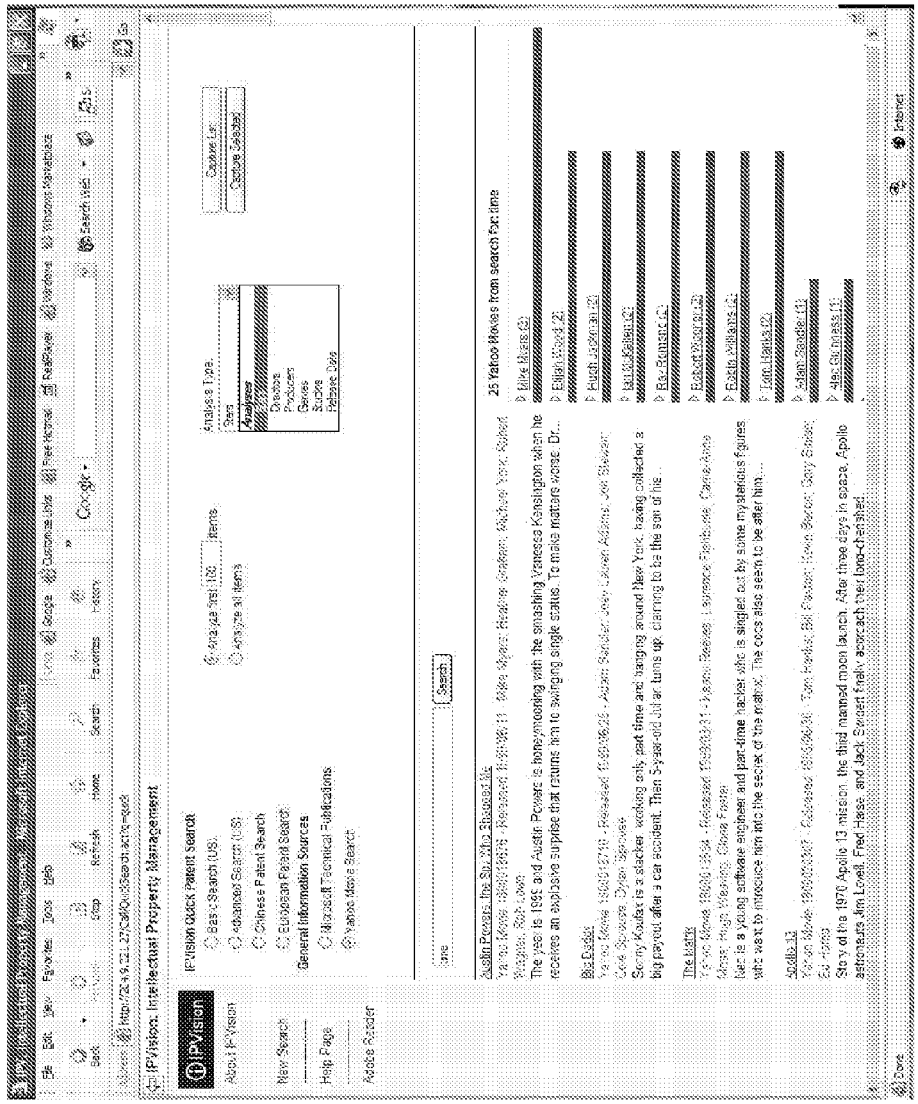
FIG. 32 illustrates an embodiment of the present invention, similar to that of FIGS. 4 through 27, wherein results of a query to a search engine are the subject of analysis, but wherein the content being analyzed is movies rather than patent citations.

FIG. 32 illustrates an embodiment, similar to that of FIGS. 4 through 27, wherein results of a query to a search engine are the subject of analysis, but wherein the content being analyzed is movies rather than patents. In particular, in this embodiment, it can be seen that search queries can be directed, not only to search engines for patents of the United States Patent and Trademark Office, of the Chinese Patent Office, and of the European Patent Office, but also for general information sources including Microsoft Technical Publications, MSN Money ETF Funds, and the Yahoo Movie Search. In this example, the radio button is selected for Yahoo Movie Search, and the Analysis Type can include histograms of Stars, Directors, Producers, Genres, Studios, and Release Date. The search is directed to movie descriptions that include the word "time". We have specified "Stars" as the Analysis Type that is to be directed to the content, recovered by the search engine, shown on the left-hand side of the web page, of movies having a description in which the word "time" appears. The analysis on the right side of the web page is thus a series of histograms showing the frequency of occurrence of each identified Star in the movies in the search results. Moreover, the residences of these Stars, for example, may be indicated on a geographical map in a fashion analogous to the maps described above in connection with FIGS. 19-21. Similarly, the locator icons used to indicate residences of Stars may be varied to indicate something about the Star in relation to search results content. Thus a locator icon characteristic selected from the group including icon selection, color, size, appearance, and shape—for example, icon size—may indicate the number of movies in the search results content in which the Star has appeared. In search for MSN Money ETF Funds, the analysis results may be placed on a map according to location of headquarters for the fund, and the locator icon color may be indicative of size of the fund.

In other words, societal analyses and multi-level analyses, analogous to those described above, may be performed in a wide range of contexts outside of patents. Accordingly patents provide an important, but by no means unique, context for implementation of embodiments of the present invention.

Logical Processing to implement these embodiments. The embodiments described above may be implemented using an approach as follows.
1. interacting with a searchable web site to specify parameters of a search, and
2. receiving the HTML search result
3. processing the received HTML to extract a set of received data,
4. analyzing the set of received data to produce analysis results, and
5. creating a visualization of the analysis results.

In the course of this implementation, receiving the HTML may require requesting and receiving more than one web page. Processing of the received HTML may be done in a browser. Moreover, from the received HTML, data may have elements that contain received data but which are not visible when the search result is rendered in a browser element. Analysis of the set of received data may be done in a browser, and may involve additional data not contained in the set of received data. The visualization of the analysis may contain a statistical representation or graphical mapping, may be in the form of HTML that can be shown in the browser, and may be shown in the context of the received set of data from the searchable web site. Related embodiments may include autofetch of the list of results from the search engine, either up to a specified number or until all are retrieved. Moreover, processing the HTML from the web site may be accomplished so that user-selected elements of the analysis results in the displayed web page can be highlighted in the search engine results element, thus making visualization of the analysis results interactive.

Figure 28:
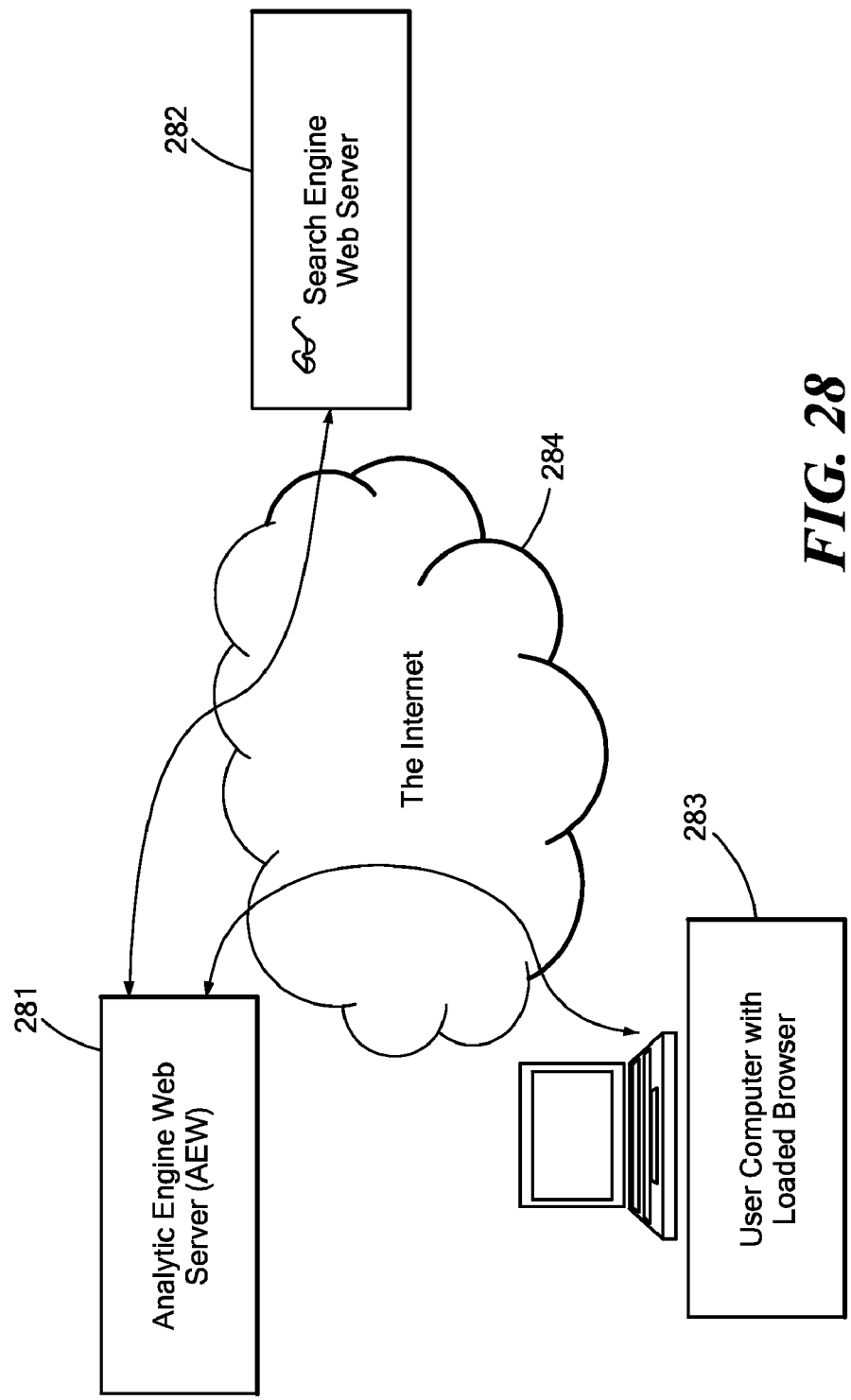
FIG. 28 is schematic diagram showing a typical structural setting with respect to which embodiments of the present invention are applicable.

We now consider logical processing associated with invoking the search using the patent analytics web page of FIG. 4. FIG. 28 illustrates the general context. A user's digital computing device, implemented here as computer 283, with a loaded web browser accesses the analytic engine web server 281 over the internet 284. In turn, the analytic engine web server 281 accesses the search engine web server 282 over the internet.

Figure 29:
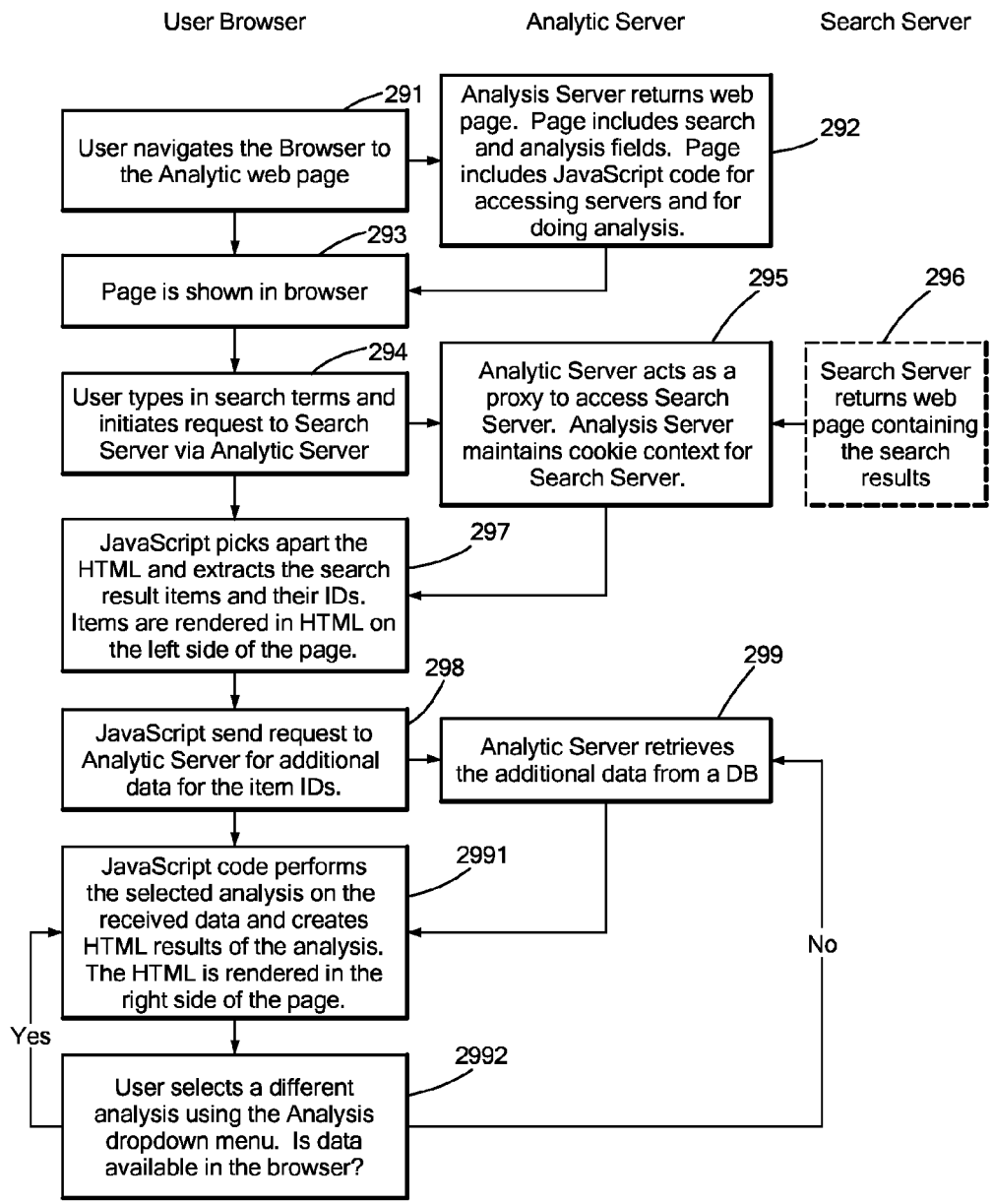
FIG. 29 shows detail of logical processes, in accordance with an embodiment of the present invention, associated with the user digital computing device 283 of FIG. 28 running the browser application, and the analytic engine server 281.

FIG. 29 shows detail of logical processes, in accordance with an embodiment of the present invention, associated with the user computer 283 of FIG. 28 running the browser application, and the analytic engine server 281. FIG. 29 has three columns of boxes, the leftmost column corresponding to processes associated with the browser application accessing web pages served by the analytic engine server, the middle column corresponding to processes associated with the analytic engine server itself, and the rightmost column corresponding to processes associated with the search engine server. In this figure, the search engine server operates in a conventional manner, and so its processes are shown in dashes. In process 291, the user navigates the browser to the analytic server web page. In process 292, the analytic engine server returns the web page, which includes a search field element (for receiving information that is later passed to the search engine server) and an analysis field element (by which the user can specify the type of analysis to be performed on search results returned by the search engine server). The analytic web page returned by the analytic engine server includes JavaScript code used by the user's browser application for accessing servers and for doing analysis in a manner we will describe. In process 293, the user's computer receives, and its browser application causes display of, the analytic web page containing the elements for entering the search query and for specifying the analysis type. With the displayed page, the user can thus enter the search query and can specify the analysis type. In process 294, the user enters the query, specifies the analysis type, and actuates the graphical box labeled "Search" or the equivalent to send the relevant information to the analytic engine server. The JavaScript uses the XMLHTTP capability of the browser to do an HTTP request. In forming the XMLHTTP request, the JavaScript encodes the search request information into the URL of the request. (XMLHTTP is a set of application programming interfaces enabling via a standard protocol the transfer of data to a web page without having to reload the web page.) Then in process 295, the analytic engine server receives the HTTP request and, acting as a proxy to access the search engine server, forwards the query to the search engine server. In process 296, the search engine server receives the information, produces search results, and returns them to the analytic engine server. In its role as proxy in process 295, the analytic engine server receives the search engine results and serves them to the user's running browser application. The analytic server acting as proxy maintains the cookie context for the search engine server, In process 297, the JavaScript code, previously downloaded as part of process 293, and running in association with the browser application, processes the HTML text constituting the search engine results to extract and reassemble the HTML elements containing the patent entries in the search result. The reassembled HTML is placed into a <DIV> (establishing what we have called above the "first element") in the left side of the patent analytics web page (which was downloaded in process 293). This is done by setting the "innerHTML" attribute of the <DIV> to contain the HTML. The browser application processes the HTML and then displays the search results as they would appear if the user were on the www.google.com/patents web site, except that the other parts of the Google search result page are not present.

Second, in process 298, the JavaScript processes the HTML search engine results to extract the patent numbers and to make a request of the patent analytic server to get supplementary data about those patents. The request for supplementary data is performed using an XMLHTTP post request, with the patent numbers encoded into the post data of the HTTP.

In process 298, the JavaScript processes associated with the browser cause initiation of a request to the analytic engine server for data, supplementary to the search results, pertaining to the item identification (here, the patent numbers); the supplementary data are typically governed by the criteria specified for the analysis. In process 299, the patent analytics server looks up the supplementary data for the patents, including the patent title, application date, inventors, inventor addresses, original assignees, current assignees, examiner, and patent classes. The server then creates JavaScript source code containing an object that has the table of patent data. The JavaScript source code is returned to the browser in the XMLHTTP reply.

In process 2991, the JavaScript processes associated with the browser perform the analysis, on the search results data as supplemented by the database accessed in process 299, based on the specified criteria. The JavaScript code running in the browser takes the JavaScript source code and evaluates it using the eval( ) function. This causes the patent data contained in the reply to become available in the browser's JavaScript environment. The JavaScript processes the patent data to create, for example, binned histogram data and creates an HTML representation of the histogram, as part of process 2991. The HTML is placed into a divided section of the patent analytics web page, by using the <DIV> tag, so that the resulting analysis appears as an element on the right-hand side of the page. This is done by setting the "innerHTML" attribute of the <DIV> to contain the HTML.

The type of the analysis is determined by the "Analysis Type" dropdown menu at the top of the patent analytics web page. In one embodiment, the "Analysis Type" initially defaults to "Assignees". If the user changes the analysis type, in process 2992, by using the dropdown menu, the JavaScript processes first determine whether additional data are needed to perform the newly requested analysis. If additional data are not needed, then logical flow returns to process 2991 and again the processes perform the analysis and cause display of the analysis results as the right-hand element of the analytic web page. Again, the corresponding new HTML is placed into the <DIV> on the right side of the page to establish what we have called the "second element". If additional data are needed, then the processes invoke the analysis engine server to provide the additional data in process 299. Once the data are provided, then logical flow again goes to process 2991 for performing the requested analysis as just recited.

Figure 30:
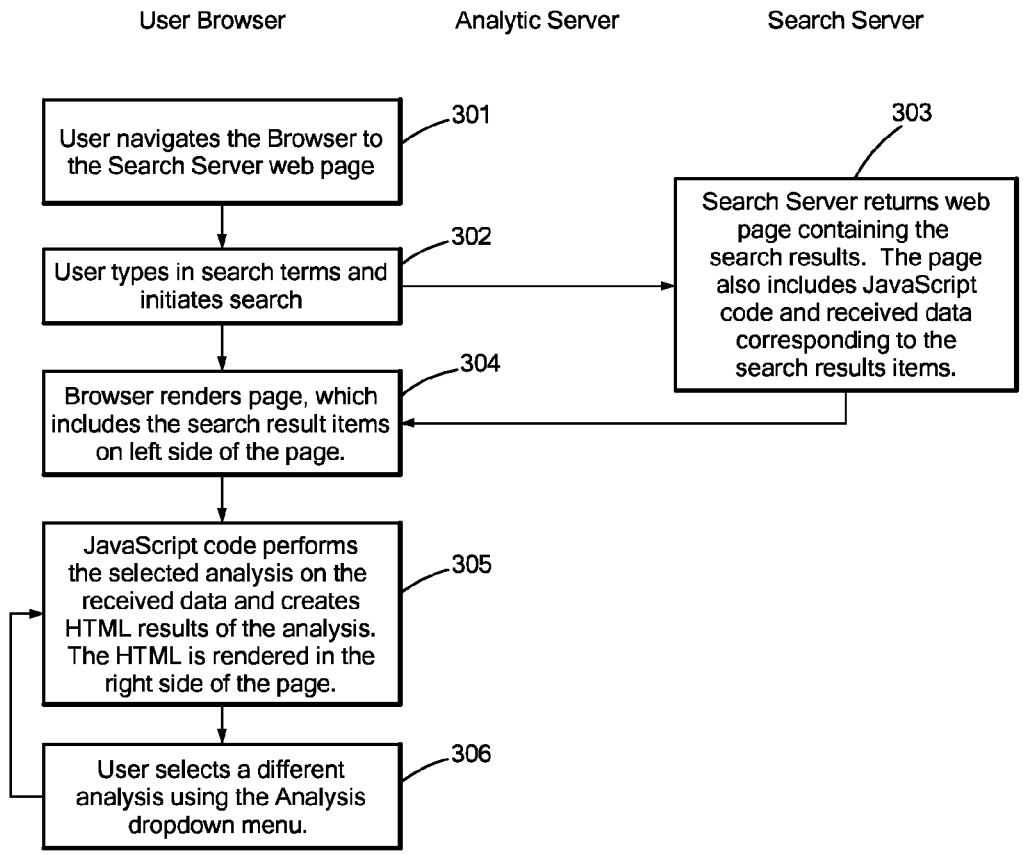
FIG. 30 shows an embodiment similar to that of FIG. 29, but wherein the search engine server also performs processes that are performed by the analytic engine server in FIG. 29.

In FIG. 30 is shown an embodiment similar to that of FIG. 29, but wherein the search engine server also performs processes that are performed by the analytic engine server in FIG. 29. Accordingly, there are no boxes beneath the heading "Analytic Server" in this figure. In process 301, the user navigates the browser to the search engine server web page. In process 302, the user enters the relevant analysis type and search fields. In process 303, the search engine server returns a web page containing the search results, and also including JavaScript code for execution in association with the user's browser application. In addition, the search engine server delivers supplementary data, corresponding to the search results, that can be used in analysis downstream. In process 304, the browser application running on the user's computer renders the web page, including the search results, which are placed on the left side of the page. Meanwhile, in process 305, the downloaded JavaScript code running in association with the browser performs the analysis according to the criteria specified by the user in process 302 on the received data and creates HTML for visual display of the analysis results. The HTML is rendered by the browser on the right side of the web page. In process 306, the user may select a different analysis from the dropdown menu, and such analysis is then performed in process 305, again with the JavaScript code, and produces a new rendering in the right side of the web page reflecting the new analysis results. Optionally, in a fashion analogous to processes 298 and 299 of FIG. 29, before process 305, the JavaScript may send a request to the Analytic Server for additional data for the item IDs (as in process 298), and the Analysis Server in response may retrieve the additional data from a database (as in process 299). Similarly, in a fashion analogous to process 2992, if, in process 306, the user selects a different process using the Analysis dropdown menu requiring data not available in the browser, the JavaScript may again generate a request to the Analytic Server for additional data, and (as in process 299) the Analysis server in response may retrieve the additional data from a database, so that the JavaScript may perform the requisite analysis in process 305

Figure 31:
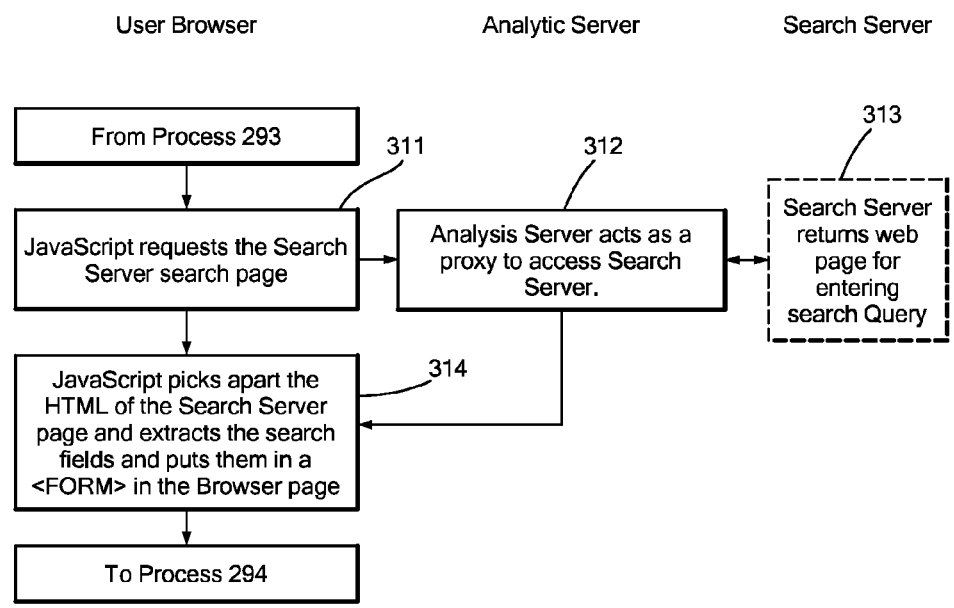
FIG. 31 illustrates yet another embodiment of the invention, similar to the embodiment of FIG. 29, but with the modification that relevant portions of the search engine server's web page for receiving search queries are presented to the user as an element of the analysis web page.

FIG. 31 illustrates yet another embodiment of the invention, similar to the embodiment of FIG. 29, but with the modification that relevant portions of the search engine server's web page for receiving search queries are presented to the user as an element of the analysis web page, so the user has an experience in entering the search query that replicates the experience in accessing the search engine web page directly. We begin with process 293 of FIG. 29, wherein the analysis server web page is displayed in the browser. At this point, in process 311 of FIG. 31, the JavaScript code running in association with the browser initiates a request for the search engine server's web page for entering search queries. This request is received by the analysis server, which in process 312 acts as a proxy to pass the request to the search engine server. In process 313, the search engine server returns its web page for entering search queries. The analysis engine server, acting as proxy in process 312, forwards the web page to the user's computer. In process 314, the JavaScript code running in association with the browser picks apart the HTML of the web page from the search engine server, extracts the search fields, and places them in a <FORM> in the analysis web page being rendered by the browser. At this point, logical flow continues as described in connection with process 294 of FIG. 29, wherein the user may enter the search terms.

The processes described above can be (and are) used for implementing a wide range of analyses. We now specifically discuss how the processes of FIG. 29 are implemented to provide Inventor Maps, as illustrated in FIGS. 19-21. During the initial pass through processes 298 and 299, JavaScript code (running in association with browser when the web page from the analysis engine server is downloaded) retrieves the front page data (including inventor addresses) for all the patent IDs (i.e. patent numbers) returned by the Google patent search engine server. This is done with an XMLHTTP request to the analysis engine server.

When the user selects Inventor Map option in process 2992, the JavaScript for the Inventor Map analysis processes the existing inventor addresses to create a list of unique addresses. The JavaScript for the Inventor Map analysis uses XMLHTTP to send the list of unique addresses to the analysis engine server (along the path marked "No") and get back a list of latitudes and longitudes corresponding to the addresses. Although this request goes to the analysis engine server, it could go to any server that can provide the information.

The JavaScript for Inventor Map analysis uses the Google Maps JavaScript library to generate the HTML that shows the map of inventor addresses. Getting access to the Google Maps library is done by using a <script> tag in the web page having the following form:

<script src="http://maps.google.com/ . . . " type="javascript/text"/> where the src attribute is an HTTP address pointing to the JavaScript file containing the Google Map library JavaScript code on the Google server.

The JavaScript for Inventor Map analysis creates a GMap2 object using the Google Map library. The GMap2 object is given an element in the page (in this case a <div>) where GMap2 object is expected to put in the HTML representing the Google Map.

The Inventor Map analysis uses the Google Map library to create a GMarker object (such as a graphical pushpin or thumbtack) for each unique address, setting the latitude, longitude corresponding to the address. For each unique address, the Inventor Map analysis creates HTML listing all the inventors and their patents for inventors who have that address. The HTML is provided to the GMarker. The GMarker event handling code shows the HTML when the user clicks on the Marker (e.g. see FIG. 21). The GMarker is handed off to the GMap2 object. The GMap2 object also pulls in the bitmaps that show the map of the United States and provides the interface for pan and zoom functionality.

In this example, the JavaScript code for Inventor Map analysis uses the Google Map JavaScript library as a 3rd party library that is capable of generating HTML to be rendered in the web page. The other analyses described here are based on JavaScript code provided in its entirety by the analysis engine server.

The fact that the Google Maps JavaScript code comes from a server different from the analysis engine server providing the other analysis JavaScript is a technical detail. Just as in process 299, the latitude and longitude information could come from any server that supports the functionality, additional JavaScript code for analysis or rendering of the analysis result can be accessed from any server that is configured to give access to the JavaScript file(s). In this example, instead of using the third party Google Map JavaScript code, we could have written our own JavaScript code that created the HTML for a map with markers; however, the ability to use an existing full featured library provides great leverage in creating functionality.

The embodiments of the invention described above are intended to be merely exemplary; numerous variations and modifications will be apparent to those skilled in the art. All such variations and modifications are intended to be within the scope of the present invention as defined in any appended claims. We provide a few examples. Various embodiments involve accessing databases for information supplemental to the search results content from a web-based search engine. The databases utilizable for obtaining such supplemental information include various types of databases, in terms of both structure and content. Such databases include flat file structures such as a user's own contact database, maintained on a digital computing device, using, for example, Outlook brand software, part of the Office suite of products, available from Microsoft Corporation, Redmond Wash., for supplying information about individuals and companies. Numerous additional web-based sources also exist for such a purpose, such as, for example, LinkedIn, www.linkedin.com, and Facebook, www.facebook.com, Databases utilizable for obtaining such supplemental information also include relational databases of various kinds, including SQL databases available as SQL Server from Microsoft, Oracle from Oracle Corporation, Redwood Shores, Calif., and DB2 from IBM, Poughkeepsie, N.Y. We have mentioned Google Maps for mapping purposes, but numerous alternatives exist, including, for example, Yahoo Maps. We have mentioned use of JavaScript and applets running in the browser application, but related and other solutions may be used in embodiments of the present invention, including AJAX (Asynchronous JavaScript and XML), Java applets, and (from Microsoft) ActiveX and VBScript.

In another embodiment of the present invention, both the web-based search engine and the user's digital computing device may be merged into the same facility, so that a single stand alone computer accesses the search engine data to obtain search results content and performs the analysis of the search results content.

What is claimed is:

1. A computer-implemented method of performing patent analysis on data derived from a web-based search engine, the method comprising:
    receiving at a web-based search engine a patent search query specified by a user;
    operating the web-based search engine to make search results content available in response to the search query, such content including a list of patents;
    serving a web page, including both analysis computer code and the search results content, to a client digital computing device; and
    causing display, in the client digital computing device, of the served web page, wherein the digital computing device executes a browser application that causes the analysis computer code to be executed by the client digital computing device and not by a separate server, thereby analyzing data associated with the search results content, according to criteria specified by the user when specifying the search query, to produce analysis results that apply to all patents on the list, and wherein the search results content is one element and the analysis results are another element of the displayed web page.

2. A computer-implemented method of performing patent analysis on data derived from a web-based search engine pursuant to a search query specified by a user, the method comprising:
    causing display, in a first element of a patent analytics web page, in a client digital computing device, of search results content served by the search engine, such content including a list of patents;
    receiving, by the client digital computing device, a patent analytics web page, including script, from a separate server;
    in a first computer process on the digital computing device, analyzing data associated with the search results content according to criteria, specified by the user when specifying the search query, to produce analysis results that apply to all patents on the list, including running the script, the script being configured to perform the analysis; and
    in a second computer process on the digital computing device, causing display of the analysis results.

3. A method according to claim 2 further comprising, in a third computer process, causing display of advertisements based on the analysis results.

4. A method according to claim 2, further comprising, in a third computer process, causing display of advertisements based on at least one item included in at least one of the analysis results and the search results content.

5. A method according to claim 2, wherein analyzing data in the first computer process includes analyzing data in the digital computing device and causing display in the second computer process of the analysis results includes causing display of the analysis results in the digital computing device.

6. A method according to claim 2, wherein causing display of the analysis results includes causing display of the analysis results in a second element of the patent analytics page.

7. A method according to claim 2, wherein the specified criteria include a histogram analysis of frequency of occurrence of an attribute of patents identified in the search results web page.

8. A method according to claim 7, wherein the histogram analysis is selectable from among attributes including assignees, current assignees, and inventors of the patents.

9. A method according to claim 2, wherein the specified criteria include a visual representation of a set of attributes of patents identified in the search results content.

10. A method according to claim 9, wherein the visual representation is a patent map.

11. A method according to claim 9, wherein the visual representation is of locations, on a geographic map, associated with an attribute of the patents identified in the search results content.

12. A method according to claim 11, wherein the locations associated with the attribute are addresses of inventors of the patents identified in the search results content.

13. A method according to claim 11, wherein the locations associated with the attribute are business addresses of assignees of the patents identified in the search results content.

14. A method according to claim 11, wherein the locations are identified by locator icons, and a locator icon characteristic selected from the group including icon selection, color, size, appearance, and shape indicates an attribute of the patents identified in the search results content.

15. A method according to claim 14, wherein addresses of all inventors listed in such patents and having a common assignee are indicated on the geographic map by a locator icon having a common icon characteristic.

16. A method according to claim 14, wherein addresses of all inventors or assignees listed in such patents and having only expired patents are indicated on the geographic map by a locator icon having a common icon characteristic.

17. A method according to claim 11, wherein an address of each inventor or assignee listed in such patents and holding a plurality of patents is indicated on the geographic map by a locator icon having a size that is a function of the number of patents held by such inventor or assignee.

18. A method according to claim 11, wherein an address of each inventor or assignee listed in such patents is indicated on the geographic map by a locator icon having a size that is a function of the imputed importance of patents held by such inventor or assignee.

19. A method according to claim 10, wherein the patent map includes lines indicating prior art citations.

20. A method according to claim 12, wherein the patent map is an interconnection map.

21. A method according to claim 6, further comprising:
in a third computer process, responding to a user's graphical selection of an item in the second element by graphically identifying patents in the first element pertaining to such item.

22. A computer-implemented method of performing an analysis on data from a web-based search engine, the method comprising:
receiving over a network in a digital computing device from the web-based search engine a web page having content responsive to a query;
such web page including analysis computer code, executable by the digital computing device, that performs the analysis, the analysis computer code being received over the network from the web-based search engine;
displaying the web page using a browser running in the digital computing device; and
in displaying the web page, also running the analysis computer code in the browser of the digital computing device to perform the analysis on the content so as to produce analysis results; and
displaying the analysis results using the browser.

23. A method according to claim 22, wherein the analysis is of a type that is specified by a user when specifying the query, and wherein receiving over the network the web page includes receiving a web page having code that performs the specified type of analysis and running the computer code includes running code to perform the specified type of analysis.

24. A method according to claim 22, wherein receiving the web page includes receiving the web page from an analysis server that acts as a proxy for the web-based search engine to obtain the content from the search engine and to cause inclusion of the code into the web page.

25. A method according to claim 22, wherein receiving the web page includes receiving the web page directly from the web-based search engine, such search engine causing inclusion of the code into the web page.

26. A method according to claim 22, wherein the analysis computer code includes computer code to receive and respond to a request for further analysis of the content, the method further comprising:
in response to a user request for a further analysis of the content, running the analysis computer code in the browser of the digital computing device to cause the further analysis of the content and the display of the further analysis.

27. A method according to claim 26, wherein running the analysis computer code to cause the further analysis of the content includes issuing a request to a server for additional computer code, receiving from the server a web page including the additional computer code responsive to the request, and running the additional computer code in the browser in performing the further analysis.

28. A method according to claim 26, wherein running the analysis computer code to cause the further analysis of the content includes issuing a request to a server for additional data, receiving from the server a web page including the additional data responsive to the request, and using the additional data in the browser in performing the further analysis.

29. A method according to claim 22, further comprising;
displaying the analysis results simultaneously with the web page.

30. A method according to claim 29, further comprising:
displaying the analysis results and the web page as elements of an analysis web page.

31. A method according to claim 29, further comprising:
in response to a user's graphical selection of an item in the analysis results, running the analysis computer code to cause graphical identification of search results corresponding to such item.

32. A method according to claim 22, wherein receiving the web page includes receiving the web page from an analysis server that acts as a proxy for the web-based search engine to obtain the content from the search engine and causes inclusion of the code into the web page.

33. A method according to claim 22, further comprising:
displaying the analysis results simultaneously with the web page as elements of the analysis page.

34. A method according to claim 22, further comprising:
using the computer code to issue a request for information supplementary to the content of the web page for use in performing the analysis.

35. A method according to claim 22, further comprising:
using the computer code to issue a request for information supplementary to the content of the web page for use in performing the analysis, and
directing the request to the analysis server.

36. A method according to claim 22, wherein the web-based search engine identifies patents in response to the query and wherein the analysis is of the patents identified in response to the query.

37. A method according to claim 35, wherein the web-based search engine identifies patents in response to the query and wherein the analysis is of the patents identified in response to the query.

38. Apparatus for performing an analysis on data from a web-based search engine, the apparatus comprising:
a digital computing device, such device in communication over a network with the web-based search engine, and running a browser application operating in response to a web page having content received from the search engine responsive to a query, the web page including analysis computer code downloaded to the digital computing device from a server, executable by the digital computing device and configured to perform the analysis;
such browser application running the analysis computer code, in the web page, that to perform the analysis on the content to produce analysis results;
such browser application causing display of the web page and the analysis results in the digital computing device.

39. Apparatus according to claim 38, wherein the apparatus is for performing a type of analysis specified when the query is specified, and the browser application is running code that performs the specified type of analysis.

40. Apparatus according to claim 38, wherein the analysis computer code includes computer code to receive and respond to a request for further analysis of the content and to cause the further analysis of the content and the display of the further analysis.

41. Apparatus according to claim 39, wherein the analysis computer code includes computer code to cause issuance of a request to a server for additional computer code, such additional computer code, on being run in the browser application on receipt from the server of a web page responsive to the request, causing performance of the further analysis.

42. A method according to claim 39, wherein the analysis computer code includes computer code to cause issuance of a request to a server for additional data, such additional data, on becoming available on receipt from the server of a web page responsive to the request, being used by the analysis code in performing the further analysis.

43. Apparatus according to claim 38, wherein the digital computing device is in communication with the web-based search engine through an analysis engine that acts as a proxy for the digital computing device in communicating with the search engine, to obtain the content from the search engine and to cause inclusion of the analysis computer code into the web page.

44. Apparatus according to claim 38, wherein the web-based search engine identifies patents in response to the query and wherein the analysis is of the patents identified in response to the query.

45. A computer-implemented method of performing an analysis on data from a web-based search engine, the method comprising:
receiving over a network in a digital computing device from the web-based search engine a web page having search results content responsive to a query, such content including persons identified in relation items of content, the web page including analysis computer code downloaded to the digital computing device from a server, executable by the digital computing device, configured to perform the analysis;
executing the analysis computer code, by the digital computing device, so as to analyze the search results content so as to produce analysis results that include locations associated with the identified persons; and
displaying the locations on a geographic map as an element of a web page that also includes as an element thereof the search results content.

46. A method according to claim 45, wherein the locations are identified by locator icons, and a locator icon characteristic selected from the group including icon selection, color, size, appearance, and shape indicates an attribute of items of content identified in the search results content.

47. A method according to claim 46, wherein the items of content are patents.

* * * * *

UNITED STATES PATENT AND TRADEMARK OFFICE
CERTIFICATE OF CORRECTION

| | | |
|---|---|---|
| PATENT NO. | : 8,316,001 B1 | Page 1 of 1 |
| APPLICATION NO. | : 11/779724 | |
| DATED | : November 20, 2012 | |
| INVENTOR(S) | : Paul Albrecht et al. | |

It is certified that error appears in the above-identified patent and that said Letters Patent is hereby corrected as shown below:

In Col. 20, line 54
replace "including script"
with "including a script."

In Col. 23, line 38
replace "code in the web page, that to perform the analysis on the"
with "code to perform the analysis on the."

Signed and Sealed this
Nineteenth Day of March, 2013

Teresa Stanek Rea
*Acting Director of the United States Patent and Trademark Office*